United States Patent
Heck et al.

(10) Patent No.: US 12,025,167 B2
(45) Date of Patent: Jul. 2, 2024

(54) SYSTEM FOR SECURING AN ANCHOR IN A MINERAL SUBSTRATE

(71) Applicant: Ludwig Hettich Holding Gmbh & Co. KG, Schramberg (DE)

(72) Inventors: Andreas Heck, Koenigsfeld-Neuhausen (DE); Ulrich Hettich, Schramberg (DE)

(73) Assignee: LUDWIG HETTICH HOLDING GMBH & CO. KG, Schramberg (DE)

( * ) Notice: Subject to any disclaimer, the term of this patent is extended or adjusted under 35 U.S.C. 154(b) by 302 days.

(21) Appl. No.: 17/632,010

(22) PCT Filed: Jul. 31, 2020

(86) PCT No.: PCT/EP2020/071649
§ 371 (c)(1),
(2) Date: Jun. 9, 2022

(87) PCT Pub. No.: WO2021/023652
PCT Pub. Date: Feb. 11, 2021

(65) Prior Publication Data
US 2022/0299060 A1    Sep. 22, 2022

(30) Foreign Application Priority Data

Aug. 8, 2019 (DE) .......................... 102019121463.7
Mar. 27, 2020 (DE) .......................... 102020108557.5

(51) Int. Cl.
*F16B 25/00* (2006.01)
*B28D 1/14* (2006.01)
(Continued)

(52) U.S. Cl.
CPC .......... *F16B 25/0026* (2013.01); *B28D 1/146* (2013.01); *B28D 1/186* (2013.01);
(Continued)

(58) Field of Classification Search
CPC .. F16B 25/00; F16B 25/0026; F16B 25/0052; F16B 25/0094; B28D 1/146; B28D 1/186; E04B 1/4157
(Continued)

(56) References Cited

U.S. PATENT DOCUMENTS 5,674,035 A   10/1997  Hettich et al.
6,296,433 B1  10/2001  Forsell et al.
(Continued)

FOREIGN PATENT DOCUMENTS

DE      10149755 A1    4/2003
DE   102010002214 A1   8/2011
(Continued)

OTHER PUBLICATIONS

English translation of the International Preliminary Report on Patentability from corresponding PCT Appln. No. PCT/EP2020/071649, dated Feb. 10, 2022.
(Continued)

Primary Examiner — Roberta S Delisle
(74) Attorney, Agent, or Firm — Grossman, Tucker, Perreault & Pfleger, PLLC

(57) ABSTRACT

The invention relates to a system for securing an anchor in a borehole in a mineral substrate, in particular concrete, mortar, or brickwork, comprising an anchor with a core section and a threaded section and comprising a furrowing tool for furrowing an internal thread in the borehole, wherein the furrowing tool comprises the following: a main part with a leading end and a trailing end, said main part having an outer surface on which a furrowing thread is formed that is suitable for furrowing the internal thread into the wall of the borehole. The outer surface of the main part is equipped with a plurality of elevations, each of which has a cutting edge, and all of the cutting edges lie at least partly on an imaginary (Continued)

cylinder with a diameter (do). The cutting edges are suitable for at least partially removing the inner wall of the borehole when the furrowing tool is rotated into the borehole in order to adapt the internal wall of the borehole to the imaginary cylinder.

29 Claims, 10 Drawing Sheets

(51) Int. Cl.
*B28D 1/18* (2006.01)
*E04B 1/41* (2006.01)

(52) U.S. Cl.
CPC ........ *E04B 1/4157* (2013.01); *F16B 25/0052* (2013.01); *F16B 25/0094* (2013.01); *F16B 25/00* (2013.01)

(58) Field of Classification Search
USPC .................. 411/386, 387.4, 387.5, 387.8
See application file for complete search history.

(56) References Cited

U.S. PATENT DOCUMENTS

| | | | | |
|---|---|---|---|---|
| 7,290,972 | B2* | 11/2007 | Gauthier | ............... F16B 13/002 411/389 |
| 2009/0014214 | A1 | 1/2009 | Ginter | |
| 2009/0028665 | A1 | 1/2009 | Chang | |
| 2011/0206468 | A1 | 8/2011 | Ayrle | |
| 2011/0274516 | A1 | 11/2011 | Gstach et al. | |
| 2012/0243953 | A1 | 9/2012 | Orberndorfer | |
| 2017/0266794 | A1 | 9/2017 | Hettich | |
| 2018/0231045 | A1 | 8/2018 | Hartz et al. | |
| 2018/0266467 | A1 | 9/2018 | Lin | |
| 2018/0283435 | A1 | 10/2018 | Hakenholt et al. | |
| 2020/0032832 | A1 | 1/2020 | Bickford | |
| 2020/0208422 | A1 | 7/2020 | Heck et al. | |
| 2022/0112916 | A1* | 4/2022 | Hsu | .................... F16B 25/0052 |

FOREIGN PATENT DOCUMENTS

| | | |
|---|---|---|
| DE | 102016125201 A1 | 6/2018 |
| DE | 202018103106 U1 | 7/2018 |
| EP | 0625400 A1 | 11/1994 |
| EP | 1795768 A1 | 10/2006 |
| EP | 1975421 A1 | 3/2007 |
| EP | 2458233 A1 | 11/2010 |
| EP | 2386770 A1 | 4/2011 |
| EP | 2502695 A1 | 2/2012 |
| EP | 3153723 A1 | 10/2015 |
| EP | 3354912 A1 | 8/2018 |
| EP | 3379092 A1 | 9/2018 |
| EP | 3388597 A1 | 10/2018 |
| EP | 3760885 A1 | 1/2021 |
| GB | 1097602 A | 1/1968 |
| WO | 0073671 A1 | 12/2000 |
| WO | 0212736 A1 | 2/2002 |
| WO | 2017025318 A1 | 2/2017 |

OTHER PUBLICATIONS

English translation of the International Preliminary Report on Patentability from corresponding PCT Appln. No. PCT/EP2020/071691, dated Feb. 10, 2022.
English translation of the International Preliminary Report on Patentability from corresponding PCT Appln. No. PCT/EP2020/071682, dated Feb. 17, 2022.
International Search Report from corresponding PCT Appln. No. PCT/EP2020/071691, dated Oct. 16, 2020.
Translation of EP3388597 (Year: 2018).

* cited by examiner

SYSTEM FOR SECURING AN ANCHOR IN A MINERAL SUBSTRATE

CROSS-REFERENCE TO RELATED APPLICATION

This is the U.S. National Phase Application under 35 U.S.C. § 371 of International Patent Application No. PCT/EP2020/071649 filed Jul. 31, 2020, which designated the United States and was published in a language other than English, which claims the benefit of German Patent Application No. 102019121463.7 filed on Aug. 8, 2019, both of them are incorporated by reference herein. The International Application was published in German on Feb. 11, 2021 as WO2021/023652 A1 under PCT Article 21(2).

FIELD OF THE INVENTION

The present invention is in the field of anchoring technology. In particular, it relates to a system and a method for fastening an anchor in a mineral substrate.

BACKGROUND OF THE TECHNOLOGY

Anchoring in mineral substrate, for example, concrete or masonry, serves for introducing loads from an attached component into the anchoring base or, in the sense of reinforcement, of absorbing tensile loads within a component structure. The prerequisite for this is that said anchoring can subsequently be incorporated into the structure or the anchoring base in the sense of its use.

Screw anchors which have a self-tapping thread or self-tapping grooving thread are known from the prior art, with the aid of which an internal thread is grooved into a borehole in the mineral substrate when the screw anchor is screwed in.

Alternatively, it has been proposed to form an internal thread in the borehole with the aid of a specially provided grooving tool before screwing in the screw anchor. Such a tool is disclosed in EP 0 625 400 A1, for example. DE 197 35 280 A1 and DE 199 05 845 A1 disclose a screw fastening set which comprises a thread cutter designed in the manner of a screw and a screw made of corrosion-resistant material.

WO 2017/025318A1 discloses a method for setting a screw in a substrate made of a mineral building material. An internal thread is created in the borehole by means of a tap provided with a cutting thread, and the screw is then introduced into the borehole, wherein the external thread of the screw is screwed into the thread produced by the tap in the borehole. According to this document, the outer diameter of the cutting thread of the tap should be smaller than the outer diameter of the external thread of the associated screw. In other words, it is proposed to dimension the cutting thread of the tap so that the pre-cut internal thread has an undersize with respect to the external thread of the screw. Due to said undersize, the thread tip of the external thread of the screw cuts into the substrate when the screw is screwed in despite the pre-grooved internal thread, so that when the screw is screwed in, loose substrate particles are produced on purpose, which particles, according to the teaching of this document, are intended to ensure the desired compression of the screw with the surrounding borehole wall in order to thereby stabilize the borehole. According to this document, it is preferred if the outer diameter of the cutting thread of the tap is only 0.85 times to 0.92 times the outer diameter of the external thread of the screw. As a result, when the screw is screwed in, a certain screwing resistance is also generated at the thread tip, which resistance is described as a "solid setting feeling".

ABSTRACT OF THE INVENTION

The invention is based on the object of providing a method and a system for fastening an anchor in a mineral substrate which allows easy and safe setting, but simultaneously enables a reliably high load level.

This object is achieved by a system according to claim 1, a method according to claim 26, a grooving tool according to claim 44 and an at least two-piece anchor according to claim 47. Advantageous further developments are specified in the dependent claims.

A first aspect of the invention relates to a system for fastening an anchor in a borehole in a mineral substrate, in particular concrete, mortar or masonry, which system comprises an anchor having a core section and a thread section, the core section having a core diameter $d_K$ and the thread section having an outer diameter $d_G$. The anchor can be, for example, a monolithic screw known per se having a concrete screw thread, and in this case the "core section" would be formed by the core and the "thread section" by the thread of this monolithic screw. However, the invention is not limited to such anchors. For example, the anchor can be formed by a threaded sleeve having an external thread, which threaded sleeve is hollow on the inside and therefore does not have a "core" in the narrowest sense of the word. For the purposes of the present disclosure, however, said external thread has a "core section", which in this case corresponds to a section between two adjacent thread turns. Furthermore, an anchor within the scope of the invention can also be formed in two parts, and, for example, comprising a spiral coil having a thread ridge, into which a threaded rod is screwed in the assembled state of the anchor, which threaded rod is also part of the two-part anchor. In this case, the "thread section" of the anchor is formed by the thread ridge of the spiral coil of the two-part anchor, as is explained in more detail below using an embodiment.

The system further comprises a grooving tool for grooving internal threads in the borehole. The grooving tool in this case comprises an at least approximately cylindrical or conical base body having a leading and a trailing end, wherein, typically (but not necessarily) at the trailing end, a force application device is or can be provided, via which a torque for screwing the grooving tool into the borehole and for grooving the thread can be transferred to the base body. In this case, the base body has an outer surface on which a grooving thread is formed, which is suitable for grooving the internal thread into the wall of the borehole.

A plurality of elevations are formed on the outer surface of the base body of the grooving tool, each having a cutting edge, wherein all cutting edges at least in sections lie on an imaginary cylinder having a diameter ($d_o$), and the cutting edges are suitable to at least partially remove the inner wall of the borehole when screwing the grooving tool into the borehole in order to adapt the inner wall of the borehole to the imaginary cylinder.

Contrary to the teaching of WO 2017/025318, the inventors' investigations suggest that a significant increase in load is only possible by stabilizing the concrete bracket or console at the thread base of the screw anchor. This has been confirmed by the inventors' load level critical tests, especially in cracked concrete. Under load, high pressures occur under the thread flanks of the screw anchor, which pressures lead to a kind of "plasticization" of the concrete matrix, in which pores are displaced and the concrete matrix is irreversibly deformed. Breaking out of the bracket can be prevented if the anchor creates a sufficient supporting effect, which helps to withstand the high pressures of the local load application. For this reason, the gap between the core of the anchor and the borehole wall should be as small as possible over the entire bond.

As a rule, boreholes in concrete are created with a double-edged hammer drill. A hammer stroke is superimposed with a rotary movement such that in the working stroke, the chisel is driven into the anchoring base without rotation and the return stroke is superimposed with a rotary movement. This process creates boreholes that are not cylindrical, but rather have a kind of "helix shape". The cross section of the borehole typically takes the form of a so-called curve of constant width, with a number of sides that exceeds the number of cutting edges of the drill by one. In the typical case of a drill having two cutting edges, the special case is a cross-section in the form of a so-called Releaux triangle. As a result, although the core rests against the borehole wall in many places, so that the screw core appears to sit tightly in the borehole and, when screwing in, considerable frictional forces also occur between sections of the core and sections of the non-cylindrical borehole (which would prohibit a simple increase in the core diameter of the anchor), the volume of the gap between the core of the anchor and the borehole wall is larger than would be necessary for an optimal support effect.

The invention therefore provides a system having a special grooving tool having an at least approximately cylindrical or conical base body having an outer surface on which a grooving thread is formed, which is suitable for grooving the internal thread into the wall of the borehole. A plurality of elevations are further formed on the outer surface of the base body of the grooving tool, each having a cutting edge, wherein all cutting edges at least in sections lie on an imaginary cylinder having a diameter $d_o$, and the cutting edges are suitable to at least partially remove the inner wall of the borehole when screwing the grooving tool into the borehole in order to adapt the inner wall of the borehole to the imaginary cylinder. As a result, the shape of the borehole is typically not only homogenized, but also smoothed. This makes it possible to use anchors having a larger core diameter than without such machining of the inner wall of the borehole with the aid of the grooving tool, without increasing the screwing forces appreciably due to the friction of the core on the borehole wall. As a result, the total volume between the core of the anchor and the borehole wall can therefore be reduced, whereby the supporting effect can be increased.

The reference that the cutting edges lie "at least in sections" on the imaginary cylinder includes the possibility that the cutting edges actually lie on the imaginary cylinder over their entire length. However, this is not necessary for the function of removing the inner wall of the borehole in order to adapt it to the imaginary cylinder. For this, it is sufficient if the cutting edges lie at least over part of their length, in the extreme case only at one point, on said cylinder. For example, the cutting edges could only lie in a rear, that is, trailing section with respect to the screwing-in direction on the lateral surface of the imaginary cylinder, but taper conically in a leading section in the screwing-in direction in order to facilitate screwing. In this leading section, the cutting edges could, for example, lie on the lateral surface of a truncated cone which tapers conically in the screwing-in direction of the grooving tool and the base surface of which has the same diameter as the imaginary cylinder. It is even conceivable, although not preferred, for the cutting edges to lie over their entire length on a truncated cone, the surface lines of which are only slightly inclined with respect to the central axis; in this case, only the trailing end of the cutting edge would then lie on the lateral surface of the imaginary cylinder, corresponding to the extreme case mentioned above that they lie "only at one point" on the imaginary cylinder.

In an advantageous embodiment, the cutting edge is formed by an edge on which a substantially radial surface inclined by less than 30°, preferably less than 15°, with respect to the radial direction, and a substantially tangential surface inclined by at least 45° with respect to the radial direction, abut one another, wherein the surface normal of the substantially radial surface points in the screwing-in direction. In this case, the "screwing-in direction" means the direction of rotation when screwing in, that is, a tangential direction, not the axial advance direction that results when screwing in. The "substantially radial surface" is at least roughly speaking perpendicular to the borehole wall, while the "substantially tangential surface" is a surface that is at least more parallel than perpendicular to the borehole wall. A stable, sufficiently sharp and low-wear cutting edge can be provided with this shape.

In an advantageous embodiment, the grooving tool has at least four, preferably at least six, of said elevations with an associated cutting edge. Such a large number of elevations helps to provide an almost cylindrical shape of the inner wall of the borehole. An embodiment having only two or three cutting edges is possible, but in practice leads to an inferior shape of the machined borehole and also to increased wear on each individual cutting edge. Similar to the drill, a cross-sectional shape can also result here that is at least similar to a curve of constant width and approaches a circle with an increasing number of elevations, so that the shape of the treated borehole becomes more similar to a cylindrical shape with a greater number of elevations.

In a preferred embodiment, the anchor is produced with a manufacturing tolerance of less than $0.2 \cdot (d_b)^{0.3}$ mm with respect to the core diameter $d_K$, the grooving tool is produced with a manufacturing tolerance of less than $0.1 \cdot (d_b)^{0.3}$ mm with respect to the diameter $d_o$, and the following applies:

$$0.0 \text{ mm} \leq d_o - d_K \leq 0.7 \text{ mm, preferably } 0.1 \text{ mm} \leq d_o - d_K \leq 0.5 \text{ mm}.$$

The nominal diameter $d_b$ of the borehole here corresponds to the size specification of a drill, to which the anchor is matched, in millimeters, but is itself dimensionless. So if the anchor is intended for use with an 8 mm drill bit, for example, then $d_b = 8$. The manufacturing tolerances are scaled to the power of 0.3 of the nominal diameter $d_b$. This dimensioning results in a very small volume between the core of the anchor and the borehole wall, which in practice offers high load-bearing capacities under load, but at the same time avoids excessive screwing-in torques due to friction between the borehole inner wall and the core of the anchor.

In an advantageous embodiment, the anchor is produced with a manufacturing tolerance of less than $0.2 \cdot (d_b)^{0.3}$ mm in relation to the outer diameter $d_G$ of its thread, and the grooving tool is also produced with a manufacturing tolerance of less than $0.2 \cdot (d_b)^{0.3}$ mm in relation to the maximum outer diameter $d_F$ of its grooving thread, and the following applies:

$$0.0 \leq (d_F - d_G)/d_K \leq 0.15, \text{ preferably } 0.025 \leq (d_F - d_G)/d_K \leq 0.10$$

Here, the reference to the "maximum outer diameter $d_F$ of the grooving thread" takes into account the fact that the grooving thread typically has a variable outer diameter in order to form the start of the groove. However, only the maximum external diameter $d_F$ is decisive for the depth of the ultimately grooved internal thread. The same applies to the thread of the anchor, which can also have an increasing thread diameter at its leading end, but the outer diameter of the thread of the anchor is usually constant over most of the length of the anchor. The outer diameter $d_G$ here means the diameter of the smallest imaginary cylinder into which the anchor thread can be inscribed as a whole.

Deviating from the teaching of WO 2017/025318, this embodiment of the invention does precisely not consider choosing the outer diameter $d_G$ of the thread of the anchor to be larger than the maximum outer diameter $d_F$ of the grooving thread. While WO 2017/025318 proposes an undersize of the pre-cut internal thread compared to the external thread of the anchor in order to artificially remove substrate particles and to increase the insertion torque for the purpose of a "solid setting feeling", one aspect of the present disclosure seeks to treat the borehole such that the borehole itself is as close as possible to the core everywhere. A limiting factor for the anchor diameter, in spite of the treatment machining of the borehole to approximate an ideal cylindrical shape, is friction between the core and the borehole wall and an associated increase in the insertion torque. The preferred embodiment of the invention therefore avoids the additional screw-in resistance, as is deliberately created in WO 2017/025318 by deformation work at the tip of the anchor thread, in favor of the possibility of choosing a larger core diameter of the anchor. One could assume that an increase in the load can also be achieved through a particularly close contact of the thread winding tip of the anchor on the anchoring base, or even a bracing of the thread winding tip. According to the inventors' understanding, this is not the case in practice. According to the inventors' understanding, the load-limiting mechanism in a screw anchor is the behavior of the anchor under load in an opening or closing crack. If the crack opens, the thread turn tip is exposed anyway, so that the hoped-for mechanism does not come into effect in this case.

In an advantageous embodiment, the grooving thread has a plurality of turns or windings, and the plurality of elevations is arranged between turns of the grooving thread. This leads to an optimal guidance of the cutting edges in the borehole on the lateral surface of the imaginary cylinder and thus to an improved configuration of the machined borehole.

The grooving thread preferably has fewer than four turns, particularly preferably between 2.8 and 3.8 turns. In this way, the force required to screw in the grooving tool can be kept sufficiently small, even if the wall of the borehole is partially removed or ground smooth, with the aid of the cutting edges when screwing in the grooving tool.

In an advantageous embodiment, the grooving tool, preferably on the side of the grooving thread closer to the trailing end, has an annular wiping element suitable for wiping drill dust from the borehole wall. In this way, the borehole treated with the aid of the grooving tool is largely cleaned of drill dust and debris from the cutting edges. According to this embodiment, deviating from the above-mentioned WO 2017/025318, it is therefore not intended that significant amounts of substrate particles remain in the borehole between the anchor and the borehole wall. Rather, the not yet deformed concrete matrix should be supported substantially directly by the core of the anchor or the thread base, which, due to the machining of the borehole with the aid of the grooving tool, can lie closer to the concrete matrix not yet deformed under load than in the prior art.

The outer diameter of the grooving thread preferably decreases in the direction of the leading end in order to make it easier to screw in the grooving tool.

Preferably, recesses are formed in the grooving thread and incisors, in particular wedge-shaped incisors, are formed between adjacent recesses, wherein at least some of the recesses preferably correspond to the entire height of the grooving thread, so that the grooving thread is interrupted in sections.

The grooving tool, or at least its grooving thread, preferably has a Rockwell hardness of at least 55 HRC, preferably of at least 60 HRC. The grooving tool, or at least the grooving thread, can consist of an alloyed steel, tool steel, stellite, a ceramic material or a hard metal.

In preferred embodiments, the grooving tool is intended for multiple uses. This is where the grooving tool differs from some of the grooving tools known in the prior art, for example, the thread cutter from DE 199 05 845 A1, which is explicitly only intended for one-time use.

In an advantageous embodiment, the grooving tool has a drive element at its leading end, which is suitable for interacting with a force application device of the anchor or, in the case of multi-part anchors described further below, a part of the same, which is to be screwed into the borehole treated with the grooving tool. This facilitates the process of setting the anchor, which, like the grooving tool, is typically screwed in with the aid of an electric drill because the tool does not have to be changed between thread grooving and screwing in the anchor. In this case, the drive element at the leading end of the grooving tool can in particular be a polygonal drive or a hexalobular drive, which can be brought into engagement with a corresponding drive element or force application device on the anchor. However, the disclosure is not limited to such drive elements; rather, they can vary depending on the type of anchor. As will be explained in more detail below, the anchor can be formed, for example, by a threaded sleeve, at the trailing end of which, for example, a groove can be provided as a force application device or drive element; in this case, the drive element at the leading end of the grooving tool would be a corresponding element which can engage in said groove.

In some applications, it can be advantageous if the anchor or at least a part of the same is inserted completely into the mineral substrate, and in particular, countersunk into the borehole, so that its trailing end is spaced from the surface of the substrate. This applies, for example, to applications in which the anchor is formed by a threaded sleeve, by a threaded rod that, unlike a screw having a head, can be completely accommodated in the borehole, or by an at least two-part anchor, described in more detail below, in which a spiral coil is to be screwed completely into the borehole as part of the at least two-part anchor.

For such purposes it can be provided that the drive element of the grooving tool and the force application device of the anchor are adapted to one another such that they can assume an engagement position, and in this engagement position the relative orientation of the grooving tool and the anchor or said part of the same is determined such that the grooving thread lies on an imaginary continuation of the thread of the anchor, when the grooving tool is rotated in the screwing-in direction, a torque can be transmitted from its drive element to the force application device of the anchor or of the part of the same, and when the grooving tool is rotated counter to the screwing-in direction, no torque can be transmitted from its drive element to the force application device of the anchor or of the part of the same.

Because the grooving tool and the anchor are aligned in relation to one another in said engagement position so that the grooving thread lies on the imaginary continuation of the anchor thread, the grooving tool can be screwed into the borehole again when the anchor or anchor part is countersunk, without grooving another thread, because the grooving thread is automatically guided into the already existing grooved thread in the borehole due to the synchronization with the anchor thread. As long as the grooving tool is rotated in the screwing-in direction, it transmits a torque from its drive element to the force application device of the anchor/anchor part, so that said anchor/anchor part is screwed into the thread grooved in the borehole. When the anchor or the part of the same has reached the desired insertion depth, the direction of rotation of the grooving tool is reversed so that it is screwed out of the borehole. In this reverse direction of rotation, no torque is exerted on the force application device of the anchor/anchor part, so that the anchor/anchor part remains in the countersunk position.

Various configurations of the drive element of the grooving tool and of the force application device of the anchor/anchor part which offer this functionality are possible, and this aspect of the invention is not limited to a specific configuration. In preferred embodiments, the drive element of the grooving tool has a stop surface, the surface normal n of which forms an angle of a maximum of 45°, preferably a maximum of 30° and particularly preferably a maximum of 15°, with a tangential vector t, wherein the tangential vector t is defined as a vector product of an axial vector a, which is directed in the direction of the leading end of the grooving tool, and a radial vector r, the tip of which lies on the first stop surface, so that: t=a×r, and wherein the force application device of the anchor/anchor part has a first stop surface which rests against the first stop surface of the drive element when the drive element and the force application device assume the engagement position.

The tangential vector t is—graphically spoken—a vector which indicates at any time the direction in which the first stop surface is moving due to the rotation of the grooving tool in the screwing-in direction. An axial movement due to the thread pitch is superimposed on said rotation, but this is not taken into account by the tangential vector t. In the present preferred embodiment, said direction should at least approximately coincide with the surface normal n of the first stop surface, namely form an angle of at most 45°, preferably at most 30° and particularly preferably at most 15° with the surface normal n, in order to be able to effectively transmit a torque via the first stop surfaces to the force application device of the anchor/anchor part when the grooving tool is screwed in. Furthermore, the first stop surfaces help to define the relative alignment of the grooving tool and the anchor/anchor part in relation to their rotational position when the first stop surfaces rest against one another in said engagement position, in order to thereby ensure the synchronization of the anchor thread and the grooving thread in relation to their rotational position. When unscrewing the grooving tool, on the other hand, the first stop surfaces simply lift off from one another, so that no torque is transmitted from the grooving tool to the force application device of the anchor/anchor part, and the anchor/anchor part can remain in the substrate while the grooving tool is unscrewed.

In an advantageous embodiment, the drive element of the grooving tool has a second stop surface, the surface normal of which has a component in the direction of the axial vector a, and the power drive of the anchor/anchor part has a second stop surface that rests on the second stop surface of the drive element when the drive element and the power drive assume the engaged position. The second stop surfaces help to define the relative orientations of the grooving tool and the anchor/anchor part in relation to their axial position when the second stop surfaces rest against one another in said engagement position, in order to thereby ensure the synchronization of the anchor thread and the grooving thread with regard to their axial position.

In an advantageous embodiment, the drive element has an axial projection and the force application device of the anchor has a receptacle for receiving the axial projection when the drive element and the power drive assume the engagement position. The combination of the axial projection and the receptacle can produce a secure engagement between the drive element of the grooving tool and the force application device of the anchor/anchor part.

The anchor is preferably formed by a threaded sleeve or the part of the anchor is formed by a spiral coil, and the receptacle for receiving the axial projection is formed by the interior of the threaded sleeve or the spiral coil.

In some embodiments, the anchor is formed by a screw, in which said thread section is connected to said core section in a force-fitting, material—or form-fitting manner. Since the thread of the screw does not have to be formed for grooving in the anchoring base, there is great freedom with regard to the material and the manufacturing process, which can be exploited in terms of manufacturing costs and/or the respective requirements for the screw in the planned use. In preferred embodiments, the screw consists, for example, at least predominantly of corrosion-resistant steel, the hardness of which would not be sufficient for grooving of a thread in a mineral substrate by itself, of non-ferrous metal, in particular aluminum, or of plastic, which in certain embodiments can be fiber-reinforced.

In an alternative embodiment, the anchor is formed by a threaded sleeve having an external thread forming said thread section. The threaded sleeve can also have an internal thread, in particular a metric internal thread. In particularly preferred embodiments, the threaded sleeve is wound from a profile strip having a radially inner and a radially outer side, wherein a thread ridge is formed on the radially outer side, which thread ridge is suitable for being screwed into the internal thread in the borehole grooved with the aid of the grooving tool. Such wound threaded sleeves can be produced very inexpensively, but it is technically not easy to design such wound threaded sleeves such that they can groove their own thread in a mineral substrate. One difficulty here is the sufficient hardness at least in the grooving part of the thread, a further difficulty is the limited torsional strength of a wound sleeve, which makes it difficult to transmit the torques required for screwing in and simultaneous thread grooving from the trailing end, where the force would normally be applied, to the leading end, where the grooving work is carried out. In view of these difficulties, special modifications of a wound threaded sleeve have been proposed, which are described, for example, in DE 10 2013 09987 A1 and EP 3 219 442 A1. However, said requirements for the threaded sleeve do not arise, or in any case to a far lesser extent, when they are used in a system according to the invention in combination with the grooving tool. Also for the threaded sleeve, within the scope of the system according to the invention, there are the stated degrees of freedom with regard to the materials to be used, among which corrosion-resistant steel, non-ferrous metal, in particular aluminum, or plastic, in particular fiber-reinforced plastic, are also preferred. It should be noted that the threaded sleeve is also to be understood as an "anchor" within the meaning of the invention. The "core section" here is formed by the outer sleeve wall, between the thread windings.

In a particularly preferred embodiment, the anchor is formed in at least two parts and, on the one hand, comprises a spiral coil which can be screwed into the internal thread in the borehole that has been grooved with the aid of the grooving tool. The spiral coil is preferably formed by a wound profile strip having a radially inner and a radially outer side, wherein a thread ridge is formed on the radially outer side, which thread ridge is suitable for being screwed into the internal thread in the borehole grooved with the aid of the grooving tool. Furthermore, the two-part anchor comprises a screw or threaded rod having an external thread suitable for being screwed into the spiral coil. The threaded rod can in particular be formed by a formwork anchor rod, such as is commercially available from the BETOmax company, for example, and which can have a B15 or a B20 thread, for example.

The screw or threaded rod preferably has a thread that is rectangular or trapezoidal in cross section, having a flattened thread tip, which in this case forms said core section of the two-part anchor, or at least part of the core section.

This two-part design of the anchor has a number of technical advantages. On the one hand, it can be produced very inexpensively, which is particularly important for long lengths. This applies in particular to variants in which a threaded rod of the type of said formwork anchor rod is used, which is very cost-effective and is available in virtually any length in concrete construction anyhow. By combining them with the spiral coil and the grooving tool, these inexpensive threaded rods, which are known per se, can be firmly and easily anchored in the anchoring base, and can be used in particular for subsequent reinforcement, for connecting a concrete part to an existing concrete structure or for forming overlapping joints.

Two-part anchors offer advantages, especially for very long lengths, because the screwing-in forces in each individual step (that is, inserting the spiral coil, screwing in the screw/threaded rod) are limited, because suitable threaded rods are available inexpensively in all required lengths, and because the spiral coil can also be produced comparatively easily and inexpensively in the required lengths, virtually "by the meter". In contrast to this, the production of conventional screw anchors, which are usually rolled and the heads of which are formed by pressing, cannot easily be transferred to very long lengths.

A further advantage of the two-part anchor is that it offers the possibility of spreading out if there are cracks in the anchoring base, in particular concrete. For this purpose, it is advantageous if the external thread of the screw or threaded rod has at least one inclined thread flank suitable to spread the spiral coil radially under tensile loads (that is, load in a direction out of the borehole) and/or under pressure loads (that is, load in the direction into the borehole), wherein the at least one inclined thread flank forms an angle of at least 30°, preferably of at least 45°, with the radial direction. The static friction between the screw or threaded rod and the spiral coil should be sufficiently small so that the spiral coil always remains in contact with the anchoring base even when cracks form in the anchoring base, that is, follows the anchoring base by spreading when cracks form therein, which requires that the static friction between the anchoring base and the spiral coil exceeds the effective static friction between the spiral coil and the screw/threaded rod.

In an advantageous embodiment, a coefficient of static friction µH between the at least one thread flank and the section of the spiral coil that can slide along the thread flank under said tensile or compressive load is in a range of 0.05≤µH≤0.50, wherein it is further preferable that: 0.075≤µH, preferably 0.125≤µH and/or µH≤0.25, preferably µH≤0.20.

In alternative embodiments, an additional intermediate spiral coil can also be provided, arranged between the screw and the aforementioned spiral coil (that is, between the screw and the spiral coil that is to be screwed into the internal thread in the borehole that has been grooved with the aid of the grooving tool). The flank of the intermediate spiral coil then has the function of the above-mentioned thread flank upon spreading of the spiral coil. The intermediate spiral coil makes a thread of the screw of the threaded rod specially formed for spreading unnecessary. In particular, it can be combined with cheaply available screws or threaded rods, for example, formwork anchor rods, as a result of which the costs for the system as a whole can be reduced.

Preferably, an inclined thread flank, an inclined flank of the intermediate spiral coil and/or a section of the spiral coil which slides along the inclined thread flank when spreading under load has a coating that reduces the sliding resistance. Such coatings can be applied by means of chemical or electrochemical processes, as painting or by thermal spraying.

In a preferred embodiment, the following applies to the ratio of the length $h_{eff}$ of the thread section of the anchor and the nominal diameter $d_b$ of the borehole:

$h_{eff}/d_b \geq 10.0$, preferably $\geq 12.0$, particularly preferably $\geq 15.0$, and in particular $\geq 30.0$. The "length of the thread section" denotes the axial length of the part of the anchor in which the thread windings are provided.

Note that for simplicity, in the present disclosure the variable "$h_{eff}$" is used to denote both, the length of the thread section of the anchor as well as the anchorage depth of the anchor when it is in use, in accordance with the usual use. The person skilled in the art understands that the effective anchoring depth can correspond at most to the length of the thread section of the anchor, but can also be smaller, depending on the substrate or use. From the respective context, however, it is always clear whether it is the length of the thread section of the anchor itself, or its anchoring depth in use.

Note that according to EAD 330232-00-0601, the effective anchorage depth for screw anchors in concrete must not exceed eight times the nominal diameter db of the borehole. Accordingly, known screw anchors for use in concrete also have thread sections with a length that does not exceed eight times the nominal diameter db of the borehole, or at most only slightly exceeds it. Notwithstanding this, one aspect of the invention provides systems in which the length of the thread section in relation to the nominal diameter of the borehole is significantly greater. Note that this applies to both one-piece and two-piece anchors. Such exceptionally long anchors can be used in particular for the purpose of subsequent reinforcement of the mineral mounting base, especially concrete, for connecting a concrete part to an existing concrete structure or for forming overlapping joints.

According to the prior art, especially for subsequent reinforcement or the formation of overlapping joints, such as are required for connection reinforcement, corresponding anchor rods are fastened in a complex adhesive or composite process in the mineral substrate. The work steps required for this are:
- forming the borehole,
- laborious cleaning of the borehole with repeated flushing and blowing out,
- dosed filling with mortar or composite material,
- inserting the anchor rod, and
- hardening of the composite material over several hours.

The critical factor here is the creation of a secure bond between the anchor rod and the anchoring base. The quality of the bond depends on the cleanliness of the surfaces, the temperature and a composite material that is as free of bubbles as possible. Because this procedure is prone to errors, it may only be carried out by trained, certified persons, whose proof of competence must be regularly checked and verified. This method is therefore currently very complex and expensive.

Using a system according to the invention, on the other hand, subsequent reinforcement or an overlapping joint can be implemented simply, quickly, reliably and with a significantly lower risk of errors than in the prior art, without the need for specialists. A particular factor here is that practically any anchor lengths can be used when using the grooving tool, because threads of practically any length can be grooved, and the screwing force can be kept sufficiently low even with long lengths by forming the internal thread beforehand and—in preferred embodiments—by treating the borehole using the cutting edges of the grooving tool. In case of very long lengths, the aforementioned embodiment comprising the two-piece anchor is advantageous, since the forces necessary for screwing in are limited in each individual step (i.e. placing the spiral coil, screwing in of the screw/threaded rod), because suitable threaded rods are available at low price in all desired lengths, and because the spiral coil can be manufactured easily and at low costs in the desired lengths, quasi by the meter. In contrast to this, it is not possible to extend the manufacture of ordinary threaded anchors, which are typically rolled and have heads which are formed by pressing, to very long lengths without difficulty.

In a second aspect, the present invention relates to a method for fastening an anchor having a core section and a thread section in a borehole in a mineral substrate, comprising the following steps:
- drilling a borehole,
- grooving an internal thread in the borehole by screwing a grooving tool into the borehole, and
- inserting the anchor into the borehole, wherein the grooving tool comprises the following:

an at least approximately cylindrical or conical base body having a leading and a trailing end, wherein a force application device is provided, via which a torque for screwing the grooving tool into the borehole and for grooving the thread is transmitted to the base body, wherein the base body has an outer surface on which a grooving thread is formed, which is suitable for grooving the internal thread into the wall of the borehole.

A plurality of elevations is formed on the outer surface of the base body, each having a cutting edge, wherein all cutting edges at least in sections lie on an imaginary cylinder having a diameter $d_o$. Furthermore, the inner wall of the borehole is at least partially removed with the aid of the cutting edges when the grooving tool is screwed into the borehole, in order to adapt the inner wall of the borehole to the imaginary cylinder.

The anchor preferably has a core diameter $d_K$, wherein:

$0.0\ \mathrm{mm} \le d_o - d_K \le 0.7\ \mathrm{mm}$, preferably $0.1\ \mathrm{mm} \le d_o - d_K \le 0.5\ \mathrm{mm}$.

The anchor preferably has a core diameter $d_K$, the thread of the anchor has an outer diameter $d_G$, and the grooving thread of the grooving tool has a maximum diameter $d_F$, wherein:

$0.0 \le (d_F - d_G)/d_K \le 0.15$, preferably $0.025 \le (d_F - d_G)/d_K \le 0.10$.

In an advantageous embodiment, the grooving tool, preferably on the side of the grooving thread closer to the trailing end, has an annular wiping element, wherein drill dust is wiped from the borehole wall with the aid of the annular wiping element when the grooving tool is screwed in and/or unscrewed.

At its leading end, the grooving tool preferably has a drive element, which is suitable for interacting with a force application device by the anchor or a part of the same, and with the aid of which the anchor or the part of the same is screwed into the borehole treated with the grooving tool.

In an advantageous embodiment of the method, the drive element is a polygonal drive or a hexalobular drive.

In an advantageous embodiment of the method, the insertion of the anchor into the borehole comprises the following steps:
- bringing the drive element of the grooving tool and the force application device of the anchor or of the part of the same into an engagement position in which the relative orientation of the grooving tool and the anchor or said part of the same is determined such that the grooving thread lies on an imaginary continuation of the thread of the anchor,
- rotating the grooving tool in the screwing-in direction, wherein a torque is transmitted from its drive element to the force application device of the anchor or of the part of the same in order to screw the anchor or part of the same into the borehole until the anchor or part of the anchor is located completely and the grooving tool is at least partially located in the borehole,
- rotating the grooving tool counter to the screwing-in direction in order to screw it out of the borehole, wherein it does not transmit any torque from its drive element to the force application device of the anchor or of the part of the same.

In a preferred embodiment, the drive element of the grooving tool has a stop surface, the surface normal n of which forms an angle of at most 45°, preferably at most 30° and particularly preferably at most 15°, with a tangential vector t, wherein the tangential vector t is defined as a vector product of an axial vector a, which is directed in the direction of the leading end of the grooving tool, and a radial vector r, the tip of which lies on the first stop surface (80), so that: t=a×r, and wherein the force application device of the anchor or said part of the same has a first stop surface which rests against the first stop surface of the drive element when the drive element and the force application device assume the engagement position.

In an advantageous embodiment of the method, the drive element of the grooving tool has a second stop surface, the surface normal of which has a component in the direction of the axial vector a, and the force application device of the anchor or said part of the same has a second stop surface that rests on the second stop surface of the drive element when the drive element and the force application device assume the engagement position.

In an advantageous embodiment of the method, the drive element has an axial projection and the force application device of the anchor has a receptacle in which the axial projection is at least partially received when the drive element and the force application device are brought into the engagement position.

In an advantageous embodiment of the method, the anchor is formed by a threaded sleeve or the part of the anchor is formed by a spiral coil, and the receptacle for receiving the axial projection is formed by the interior of the threaded sleeve or the spiral coil.

The anchor is preferably formed by a screw or threaded rod, in which said thread section is connected to said core section in a force-fitting, material—or form-fitting manner, wherein the screw or threaded rod preferably at least predominantly consists of corrosion-resistant steel, non-ferrous metal, in particular aluminum or plastic, in particular, fiber-reinforced plastic.

In an advantageous embodiment of the method, the anchor is formed by a threaded sleeve having an external thread forming said thread section, wherein the threaded sleeve preferably has an internal thread, in particular a metric internal thread, and/or wherein the threaded sleeve is preferably wound from a profile strip having a radially inner and a radially outer side, wherein a thread ridge is formed on the radially outer side, which thread ridge is suitable to be screwed into the internal thread in the borehole grooved with the aid of the grooving tool, and/or wherein the threaded sleeve at least predominantly consists of corrosion-resistant steel, non-ferrous metal, in particular aluminum or plastic, in particular fiber-reinforced plastic.

In an advantageous embodiment of the method, the anchor is formed in at least two parts, wherein the at least two-part anchor comprises the following:

a spiral coil which can be screwed into the internal thread grooved into the borehole with the aid of the grooving tool, wherein the spiral coil is preferably formed by a wound profile strip having a radially inner and a radially outer side, wherein a thread ridge is formed on the radially outer side, which thread ridge is suitable to be screwed into the internal thread grooved with the aid of the grooving tool in the borehole, and a screw or threaded rod having an external thread that can be screwed into the spiral coil, wherein the threaded rod is formed in particular by a formwork anchor rod. Additionally or alternatively, the screw or threaded rod preferably has a thread that is rectangular or trapezoidal in cross section, having a flattened thread tip forming said core section of the two-part anchor. Said insertion of the anchor into the borehole comprises the following:

screwing the spiral coil into the internal thread in the borehole that has been grooved with the aid of the grooving tool, and screwing the screw or threaded rod into the spiral coil.

In an advantageous embodiment of the method, the external thread of the screw or threaded rod, or an additionally provided intermediate spiral coil arranged between the screw or threaded rod and the spiral coil, has at least one inclined flank suitable to spread the spiral coil radially outwards in response to a tensile force directed out of the borehole or to compressive loads in the direction into the borehole, wherein the at least one inclined flank forms an angle of at least 30°, preferably of at least 45°, with the radial direction.

Additionally or alternatively, a coefficient of static friction $\mu H$ between the at least one inclined flank of the screw or threaded rod or intermediate spiral coil and the section of the spiral coil that can slide along the inclined flank under said tensile or compressive load is in a range of $0.05 \leq \mu H \leq 0.50$, where the following preferably applies: $0.075 \leq \mu H$, preferably $0.125 \leq \mu H$ and/or $\mu H \leq 0.25$, preferably $\mu H \leq 0.20$.

Additionally or alternatively, the at least one inclined thread flank, the inclined flank of the intermediate spiral coil and/or a section of the spiral coil that slides along the inclined flank when spreading under load has a coating that reduces the sliding resistance.

In a particularly advantageous embodiment of the method, the anchor is inserted into the borehole with an effective anchoring depth $h_{\it eff}$, wherein the following applies to the ratio of the effective anchoring depth $h_{\it eff}$ and the nominal diameter $d_b$ of the borehole:

$h_{\it eff}/d_b \geq 10.0$, preferably $\geq 12.0$, particularly preferably $\geq 15.0$, and in particular $\geq 30.0$.

A system according to one of the embodiments described above can be used in all of the described embodiments of the method.

A further aspect of the invention relates to a method for reinforcing a mineral mounting base, in particular concrete, or for forming an overlapping joint in the mineral mounting base, in particular concrete, with the aid of an anchor, in which a method for fastening an anchor in the fastening base according to one of the above-described embodiments is used. The overlapping joint can be formed in particular for the purpose of a connection reinforcement, as is explained in more detail below.

A further aspect of the present invention relates to a grooving tool for grooving internal threads in a borehole that is formed in a mineral substrate, wherein the grooving tool comprises:

an at least approximately cylindrical or conical base body having a leading and a trailing end, wherein a force application device is provided, via which a torque for screwing the grooving tool into the borehole and for grooving the thread can be transferred to the base body. The base body has an outer surface on which a grooving thread is formed, which is suitable for grooving the internal thread into the wall of the borehole. A plurality of elevations are formed on the outer surface of the base body of the grooving tool, each having a cutting edge, wherein all cutting edges at least in sections lie on an imaginary cylinder, and the cutting edges are suitable to at least partially remove the inner wall of the borehole when screwing the grooving tool into the borehole in order to adapt the inner wall of the borehole to the imaginary cylinder.

The grooving tool preferably has a driving element at its leading end, which is suitable for cooperating with a driving element of an anchor which is to be screwed into the borehole treated by said grooving tool, wherein said driving element is preferably a polygonal or hexalobular drive.

A further aspect of the present invention relates to an anchor, in particular for a system according to any one of the embodiments described above, wherein the anchor is formed in at least two parts and comprises the following:

a spiral coil which can be screwed into an internal thread grooved in a borehole with the aid of a grooving tool, and
a screw or threaded rod having an external thread suitable for being screwed into the spiral coil.

The spiral coil is preferably formed by a wound profile strip having a radially inner and a radially outer side, wherein a thread ridge is formed on the radially outer side, which thread ridge is suitable for being screwed into the internal thread in the borehole grooved with the aid of the grooving tool. The threaded rod can be formed by a formwork anchor rod. The screw or threaded rod preferably has a thread which is rectangular or trapezoidal in cross section and has a flattened thread tip. All of the advantages and features described above in connection with the two-part anchor of the system also relate to the two-part anchor according to this aspect of the invention.

Although the embodiments described above for the system for fastening an anchor in a borehole, for the method for mounting an anchor in a borehole in a mineral substrate and for the method for reinforcing a mineral fastening substrate or for forming an overlapping joint in the mineral fastening base have always been described in connection with a particular grooving tool, the present disclosure is not so limited. In all of the embodiments described above, other grooving tools can also be used which merely optionally have any of the features of the preferred grooving tool described above, as long as they are suitable for grooving an internal thread in the borehole. For example less preferred grooving tools may be used, which are not provided with the elevations described above. In particular, methods and systems for reinforcing a mineral mounting base or for forming an overlapping joint as well as one-piece or two-piece anchors having suitable dimensions that are not known from the prior art, even without reference to the specifically disclosed grooving tool, are the subject of the present disclosure.

DESCRIPTION OF THE PREFERRED EMBODIMENTS

Figure 1A:
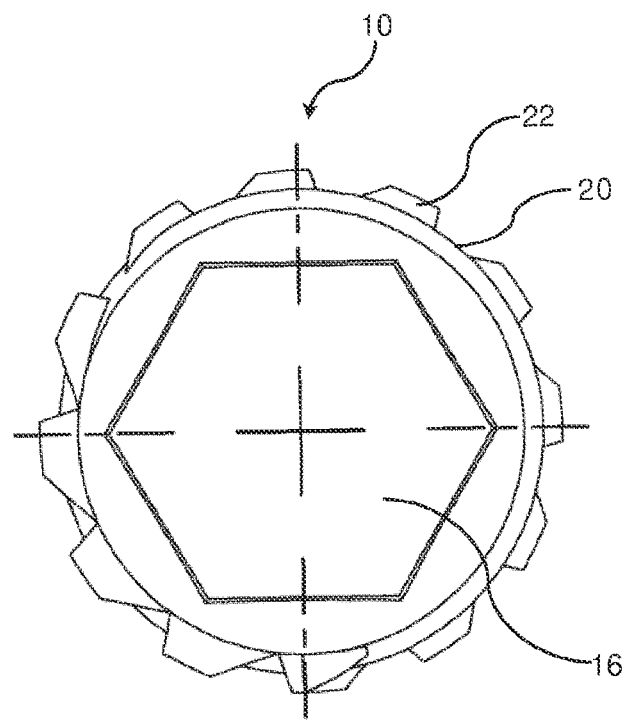
FIG. 1a-1e show different views of a first embodiment of a grooving tool.
Figure 1B:
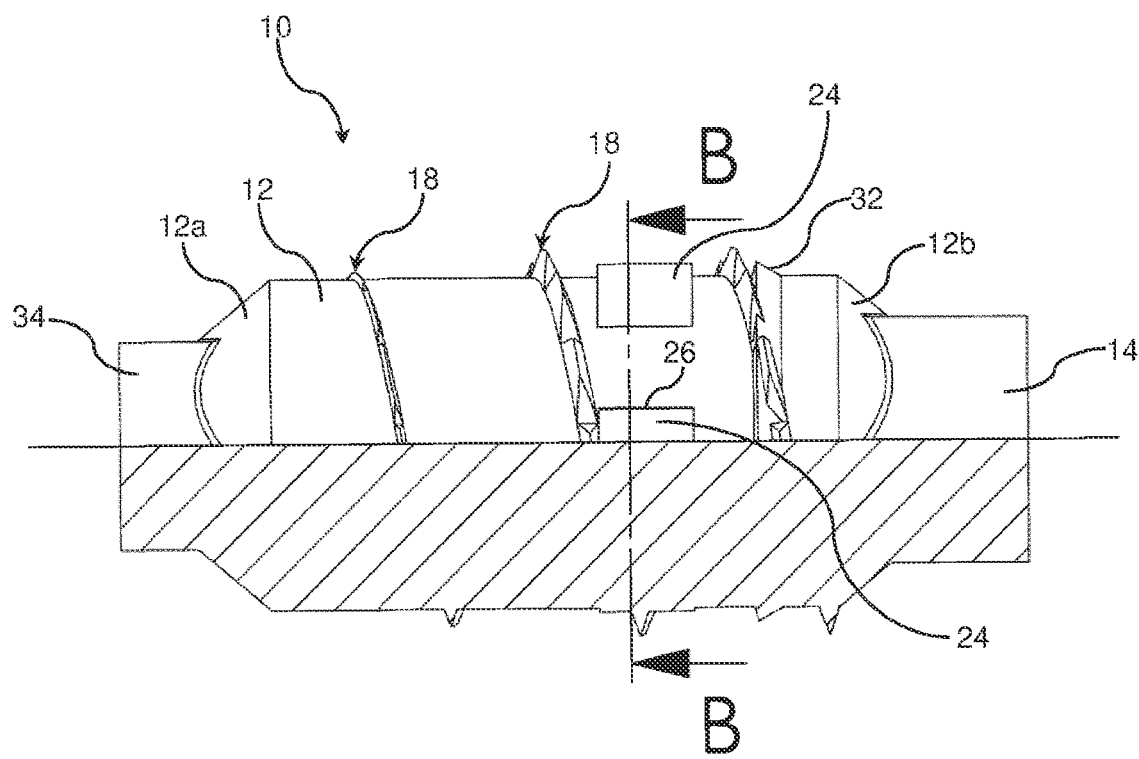
Figure 1C:
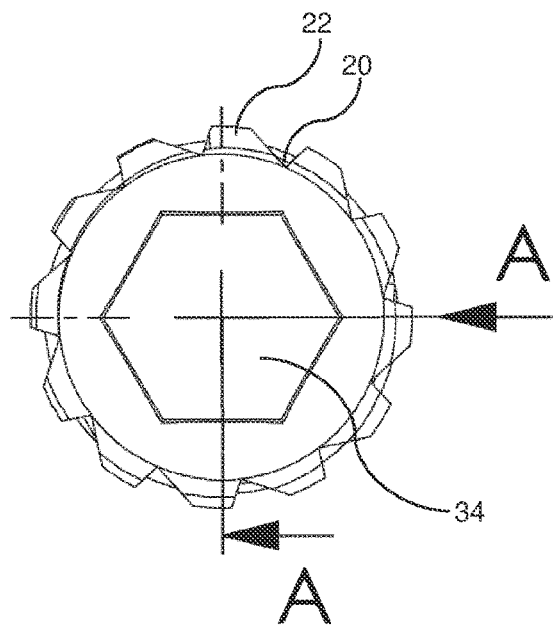
Figure 1D:
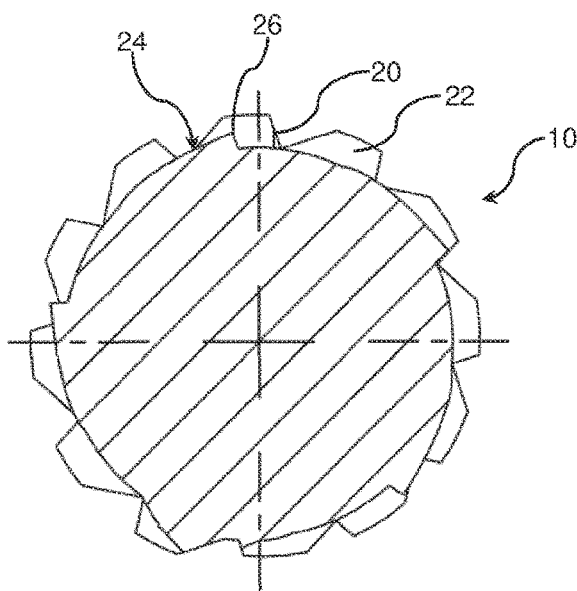
Figure 1E:
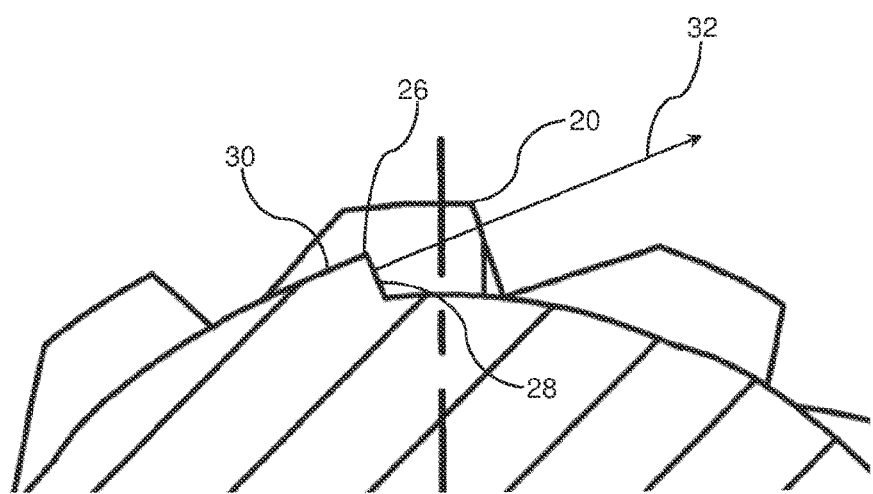

Different views of a grooving tool 10 according to a first embodiment are shown in FIG. 1a-1d (collectively also referred to as "FIG. 1"). FIG. 1b shows a partially sectioned side view, FIG. 1c shows a view of the end that leads when screwing in and is left in the illustration of 1b, FIG. 1a shows a plan view of the end that trails when it is screwed in and is on the right in the view of FIG. 1b, and FIG. 1d shows a cross-sectional view in the direction of arrows B in FIG. 1b. FIG. 1e shows an enlarged detail of FIG. 1d.

The grooving tool 10 has an approximately cylindrical base body (see FIG. 1b) having a leading end 12a and a trailing end 12b. Attached to the trailing end 12b is a force application device 14, which is a receptacle 16 (see FIG. 1a) for receiving a hexagonal tool. Using this hexagonal tool, a torque for screwing the grooving tool 10 into a borehole (not shown) for grooving an internal thread in the borehole can be transmitted to the base body 12. The other end of the hexagonal tool could then be clamped into the chuck of a drill in order to be screwed in with the aid of the drill. Instead of the force application device 16 for receiving a hexagonal tool, a shaft could also be permanently attached to the trailing end 14, which shaft could be clamped directly into the drill chuck of a drill and which would also be regarded as a "force application device" within the meaning of the invention. The force application device does not necessarily have to be provided at the trailing end 12b, but it should at least be accessible from the trailing side (that is, from outside the borehole). The advantage of the embodiment shown here, however, is that the grooving tool 10 can be used for boreholes of any depth, and only the appropriate hexagonal tool needs to be selected in each case.

A grooving thread 18 is formed on the outer surface of the base body 10, which grooving thread 18, in the embodiment shown, has fewer than three complete turns. The screwing-in forces can be limited by the comparatively small number of turns of the grooving thread 18. The outer diameter of the grooving thread 18 decreases, as can be seen specifically in FIG. 1b, in the direction of the leading end 12a. Recesses 20 are formed in the grooving thread 18, and incisors 22 are formed between adjacent recesses 20. The recesses 20 correspond to the respective height of the grooving thread 18 so that the grooving thread 18 is interrupted in sections. In alternative embodiments, however, the recesses 20 do not have to extend all the way to the surface of the base body 12.

In the embodiment of FIG. 1, five elevations 24 are formed on the outer surface of the base body 12, each having a cutting edge 26. The elevations 24 have a "rib shape", which can be seen particularly well in FIG. 1e. As can be seen in FIG. 1e, the cutting edge 26 is formed by an edge at which a "substantially radial surface" 28 and a "substantially tangential surface" 30 meet one another. The surface normal 32 of the substantially radial surface 28 points in the screwing-in direction, more precisely in the direction of rotation when screwing in. The "substantially radial surface" 28 is a surface directed at least approximately perpendicular to the borehole wall, and more precisely a surface inclined by less than 30°, preferably less than 15°, with respect to the radial direction. The "substantially tangential surface" 30, on the other hand, is a surface that is at least more parallel to the borehole wall than perpendicular thereto. More precisely, it is a surface inclined by at least 45° with respect to the radial direction.

Figure 2A:
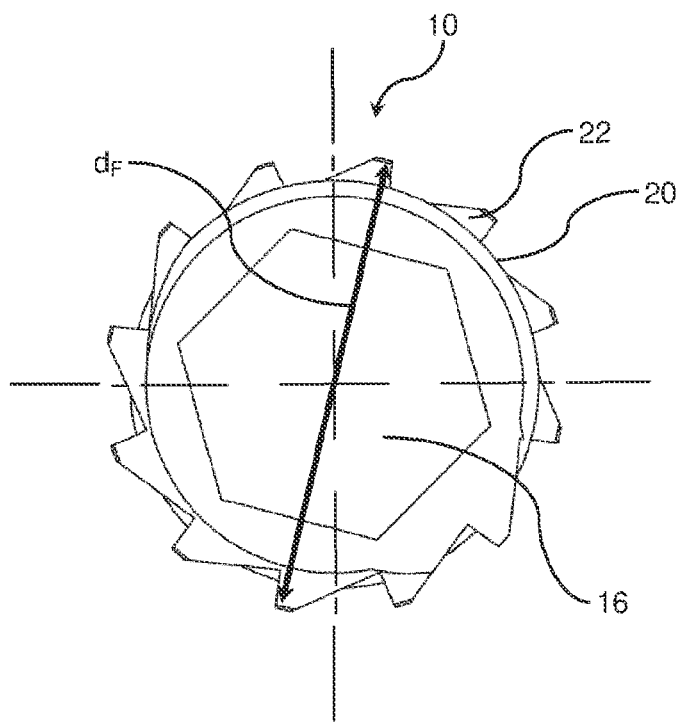
FIG. 2a-2d show different views of a second embodiment of a grooving tool.
Figure 2B:
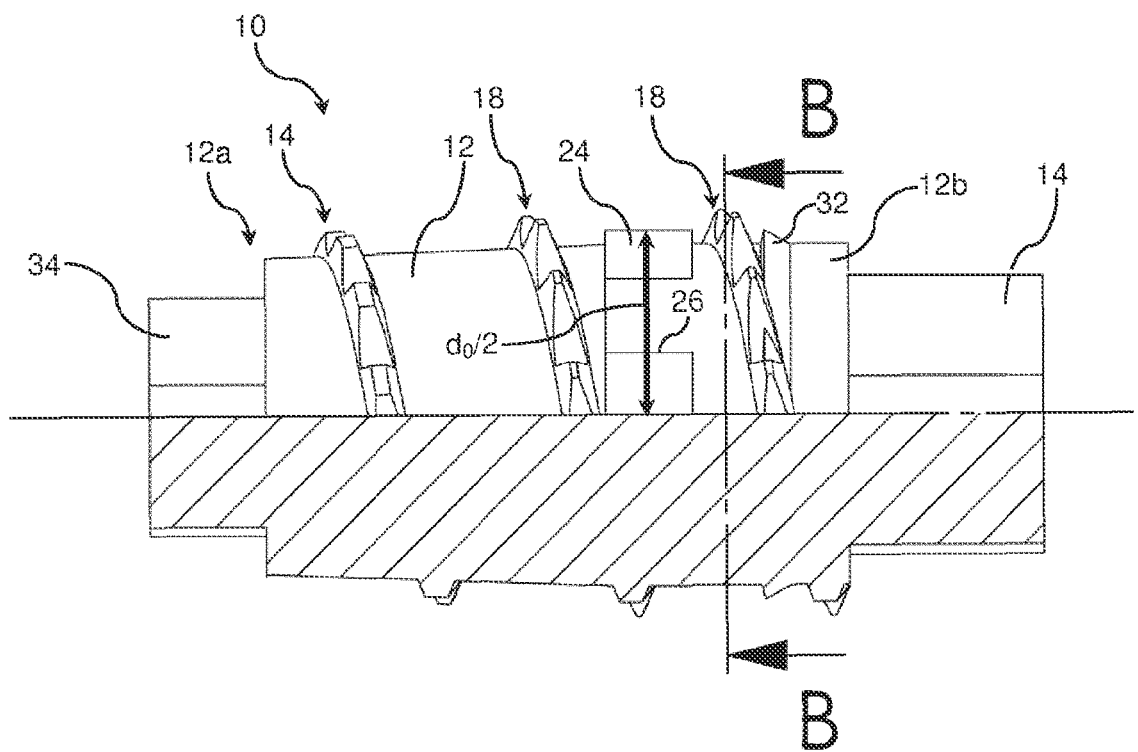
Figure 2C:
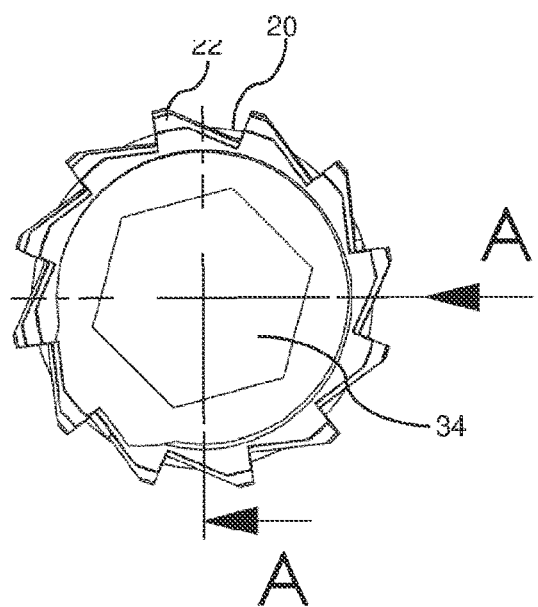

The cutting edges 26 of the elevations 24 all lie at least in sections on an imaginary cylinder having a diameter $d_o$. Half the diameter $d_o/2$ of this imaginary cylinder is shown in the embodiment of FIG. 2b. The cutting edges 26 are suitable for at least partially removing the inner wall of the borehole when the grooving tool 10 is screwed into the borehole, in order to adapt the inner wall of the borehole to the imaginary cylinder. Graphically speaking, with the aid of the elevations 24, the borehole, which has a helical shape due to its production with a hammer drill, is adapted to a cylindrical shape having a predetermined diameter $d_o$ by a grinding removal process through the cutting edges 26 of the elevations 24. This makes it possible to use an anchor having a comparatively large core diameter that is in close contact with the borehole wall practically everywhere (and not just in places, as in the case of an untreated borehole) without the frictional forces between the borehole wall and the anchor core increasing excessively when being screwed in. Overall, the volume between the borehole wall and the anchor core can be significantly reduced over the entire length of the anchor, whereby the supporting effect of the concrete console and thus the load-bearing capacity can be increased significantly.

It should be noted that the elevations 24 are arranged between two turns or windings of the grooving thread 18. In principle, it would also be possible to provide the elevations 24 on the leading end 12a of the base body 12, but the chosen embodiment allows better guidance of the cutting edges along the lateral surface of the imaginary cylinder and ultimately a better quality of the treated borehole.

An annular wiping element 32 is provided in the region of the trailing end 12b, with which wiping element 32 drilling dust can be wiped from the borehole wall. In the prior art, the drilling dust is sometimes considered useful in order to fill the intermediate spaces between the core and the concrete matrix, thereby generating a supporting effect. However, a different approach is taken in the embodiment shown. Here, the drilling dust is largely kept away from the composite, and instead the supporting effect is brought about by a small distance between the core of the anchor and the as yet undamaged concrete matrix.

Finally, a drive element 34 is provided at the leading end 12a of the base body 12 (see in particular FIG. 1c), which drive element 34 is intended to interact with a drive of an associated anchor (not shown). This facilitates the process of setting the anchor, because the tool does not have to be changed between the grooving of the thread and the insertion of the anchor.

The grooving tool shown in FIG. 1 can be produced inexpensively by reshaping (pressing). The grooving tool is hardened after the deformation (pressing) in order to obtain a Rockwell hardness of at least 55 HRC, preferably at least 60 HRC, overall, but at least in its grooving thread 18 and the elevations 24.

FIG. 2 shows an alternative embodiment of a grooving tool 10, the structure of which corresponds substantially to that of FIG. 1, and the components of which are therefore denoted by the same reference numerals. Further detailed description can therefore be omitted. The grooving tool 10 shown in FIG. 2 is to be produced in a machining process, which allows greater degrees of freedom in the design of the details, but at the same time increases the costs. While in the embodiment of FIG. 1, the base body 12 was cylindrical in order to permit production in a rolling process, the base body in the grooving tool of FIG. 2 is slightly conical. Note that the outer diameter $d_F$ of the grooving thread 18 of the grooving tool 10 is shown in FIG. 2a.

Figure 3:
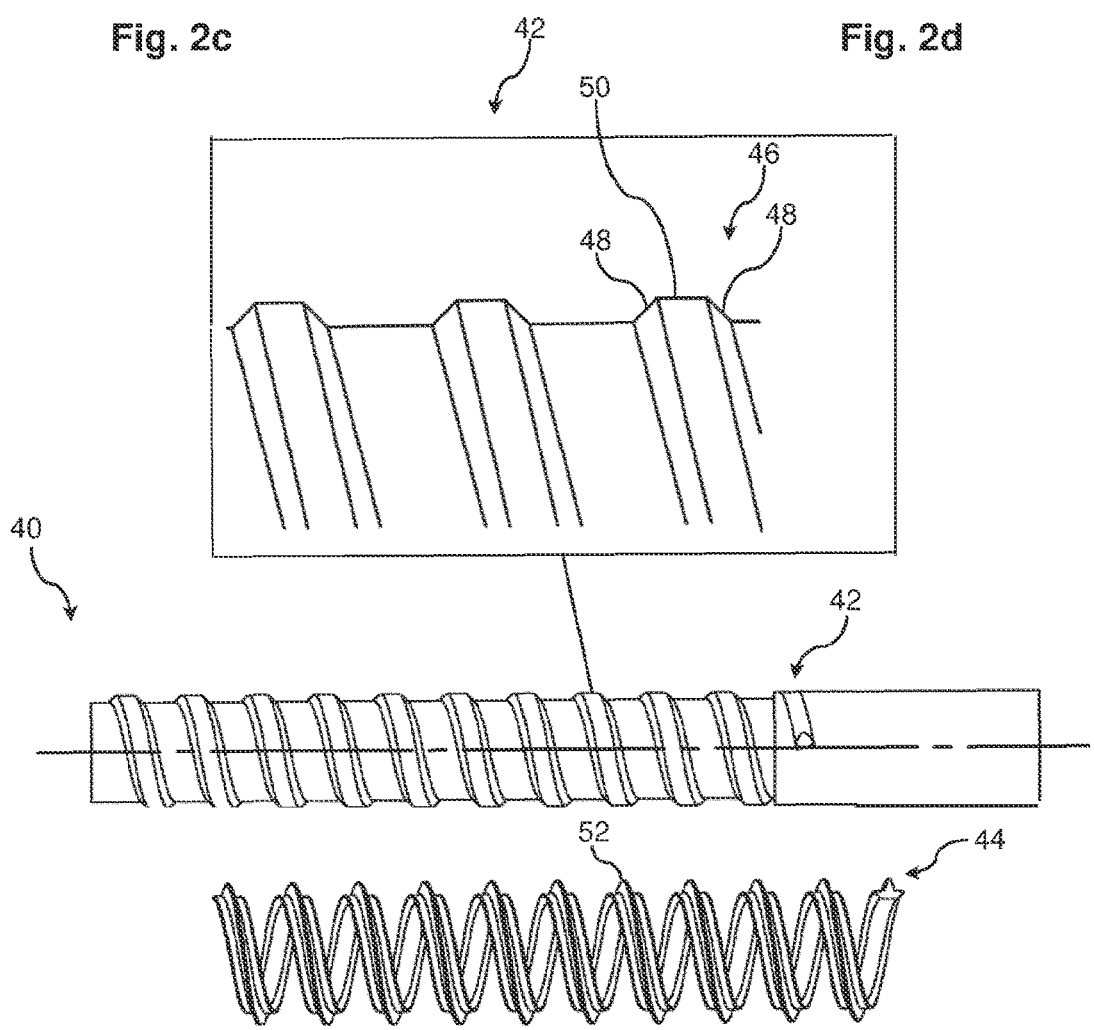
FIG. 3 shows the components of a two-part anchor.

FIG. 3 shows a two-part anchor 40, consisting of a threaded rod 42 and a spiral coil 44. In this case, the threaded rod 42 is formed by a formwork anchor rod with a so-called B15 thread, as is commercially available from BETOmax. Such threaded rods are available inexpensively in virtually any length. FIG. 3 also shows an enlarged section of the threads of the threaded rod 42. As can be seen therein, the threaded rod 42 has a thread 46 having two thread flanks 48 which are each inclined by 45° with respect to the radial direction. Furthermore, the thread is trapezoidal in cross section and has a flattened thread tip 50.

The spiral coil 44 is formed by a wound profile strip having a radially inner and a radially outer side, wherein a thread ridge 52 is formed on the radially outer side. The profile strip can be produced in a cost-effective rolling process, wherein no special requirements are placed on the hardness of the thread ridge 52 due to the pre-cut internal thread in the borehole (not shown). The spiral coil 44 can therefore be produced inexpensively and in practically any length. It should be noted that the side edges of the profile strip are beveled so that they have the same inclination as the flanks 48 of the thread 46 of the threaded rod 42.

To set the two-part anchor 40, a hole is first drilled in a mineral substrate, and an internal thread is grooved in the borehole with the aid of the grooving tool 10, as shown in FIGS. 1 and 2. At the same time, the borehole wall is machined by the elevations 24 so that the borehole is at least approximated to an ideal cylindrical shape. The spiral coil 44 is then screwed into the borehole, wherein the thread ridge 52 engages the grooved internal thread in the borehole. For this purpose, the pitch of the spiral coil 44 is adapted to the pitch of the grooving thread 18 of the grooving tool 10. Finally, the threaded rod 42 is screwed into the spiral coil 44 located in the borehole. This is shown in FIG. 4.

Figure 4:
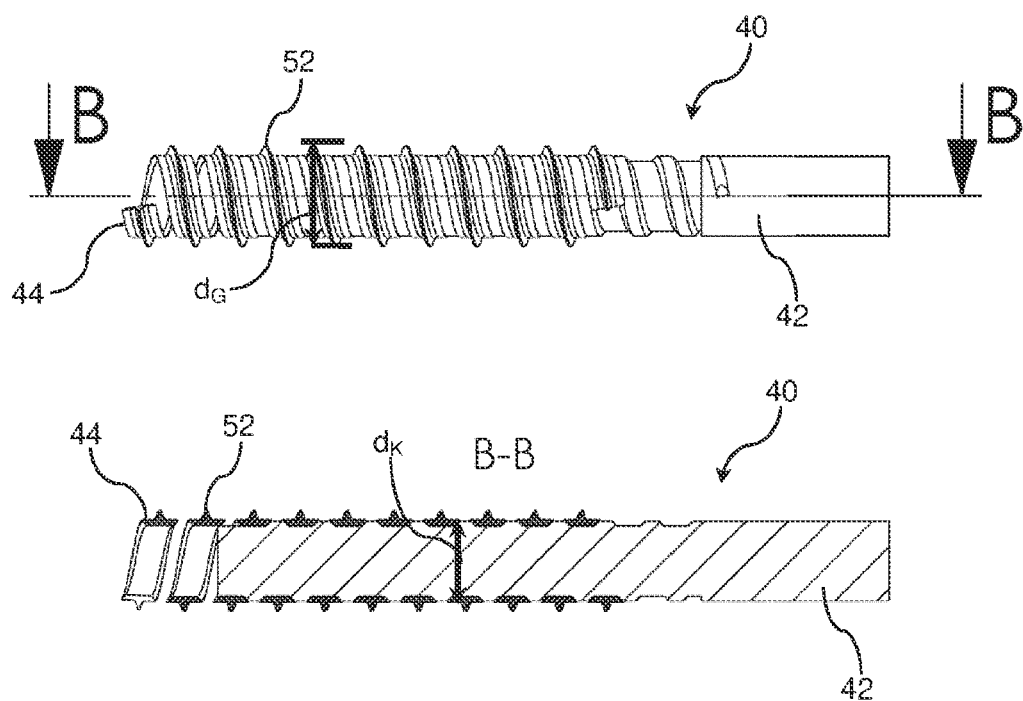
FIG. 4 shows a side view and a sectional view of a two-part anchor in the assembled state.

As can be seen from FIG. 4, the profile strip forming the spiral coil 44 is formed in terms of its width, thickness and shape (especially with regard to the beveled edges) such that it fills the spaces between the thread turns of the thread 46. In this case, the radially outer side of the profile strip and the flattened thread tip 50 together form the core or "core section" of the two-part anchor, and the diameter $d_o$ of the imaginary cylinder on which the cutting edges 26 of the grooving tool used for grooving lie is adapted to its diameter $d_K$ (see FIG. 4). The thread or the "thread section" of the two-part anchor 40 is formed by the thread ridge 52 and has an outer diameter $d_G$, which is also shown in FIG. 4.

It should be noted that the two-part anchor 40, due to the spatial separation of the spiral coil 44 and the threaded rod 42, has the ability to "spread" in the borehole under load. If an axial force acts on the spiral coil 44 under load, it has the tendency to slide up the respective thread flank 48 of the thread 46 of the threaded rod 42, that is, to move radially outward in this case. In this way, the two-part anchor can follow an enlargement of the borehole due to crack formation to a certain extent by spreading. It is beneficial therefor if the static friction between the spiral coil 44 and the threaded rod 42 is comparatively low, so that the thread ridge 52 of the spiral coil 44 remains in close contact with the mineral substrate at all times, and the relative movement takes place only between the spiral coil 44 and the threaded rod 42. For this purpose, the coil 44 is coated, in preferred embodiments, with a sliding layer on its radially inner side and the beveled edges, which lowers the coefficient of static friction $\mu_H$. The coefficient of static friction is preferably in the range $0.05 \leq \mu_H \leq 0.50$, wherein the following preferably also applies: $0.075 \leq \mu_H$, preferably $0.125 \leq \mu_H$ and/or $\mu_H \leq 0.25$, preferably $\mu_H \leq 0.20$.

Figure 5:
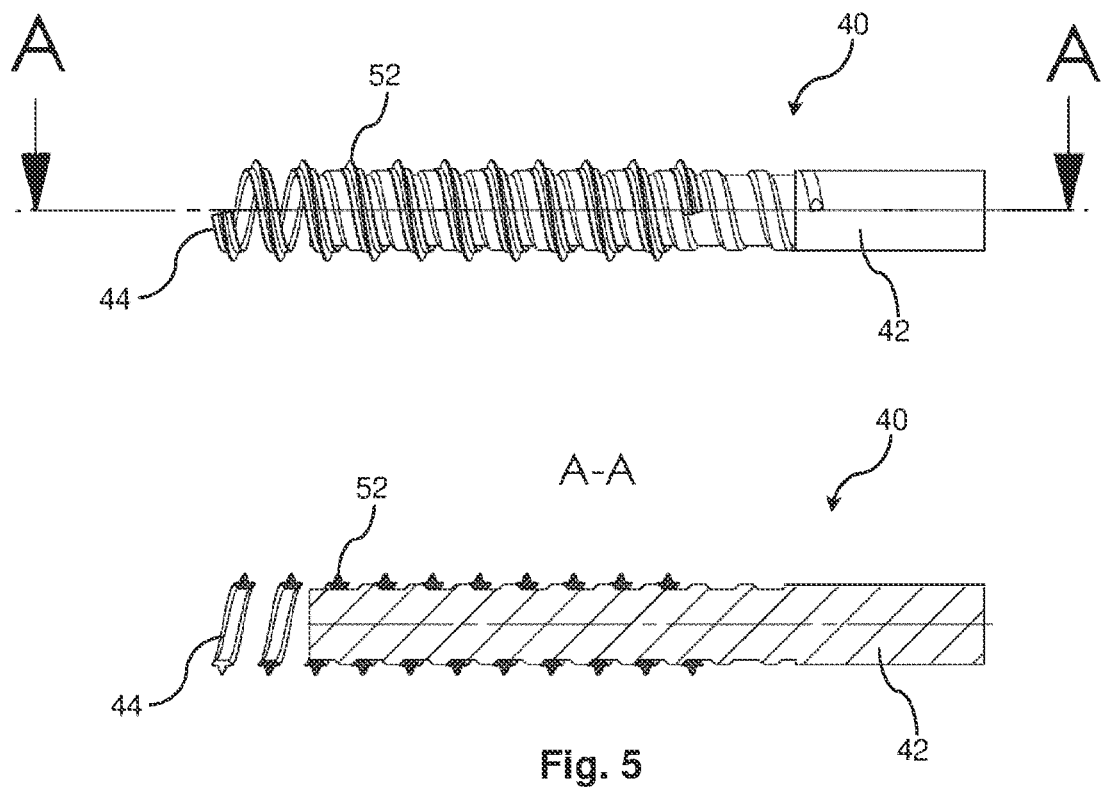
FIG. 5 shows a side view and a sectional view of a further two-part anchor in the assembled state.

FIG. 5 shows a closely related embodiment of a two-part anchor 40, with the difference that the profile strip is formed to be narrower than in the embodiment of FIG. 4. This has the consequence that the permitted relative movement between the threaded rod 42 and the spiral coil 44, and thus the adaptation to crack formation in the concrete, is increased.

Figure 6:
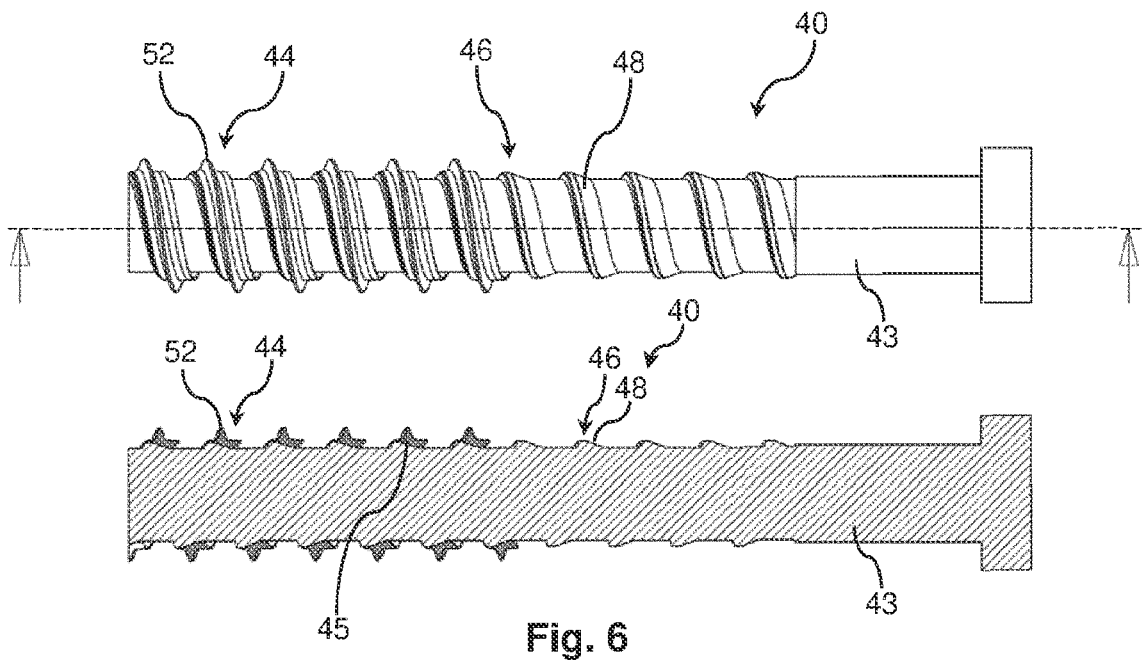
FIG. 6 shows a side view and a sectional view of a further two-part anchor consisting of a screw and a spiral coil in the assembled state, wherein the screw comprises a strongly inclined flank suitable for spreading the spiral coil under tensile load.

FIG. 6 shows a side view and a sectional view of a further two-part anchor 40 consisting of a screw 43 and a spiral coil 44 in the assembled state, wherein the screw 43 has a thread 46 having a strongly inclined flank 48 on its rearward side in the screwing-in direction, the inclination of which clearly exceeds 45° in relation to the radial direction. Such strongly inclined flanks, having angles of inclination in relation to the radial direction of 55° or more, preferably 60° or more and particularly preferably 65° or more, are particularly well suited for spreading. It should be noted that the spiral coil 44 is adapted to this strongly inclined thread flank 48. Specifically, the spiral coil 44 has an inclined bearing surface 45 having at least approximately the same angle to the radial direction as the strongly inclined flank 48 of the thread 46 of the screw 43.

Figure 7:
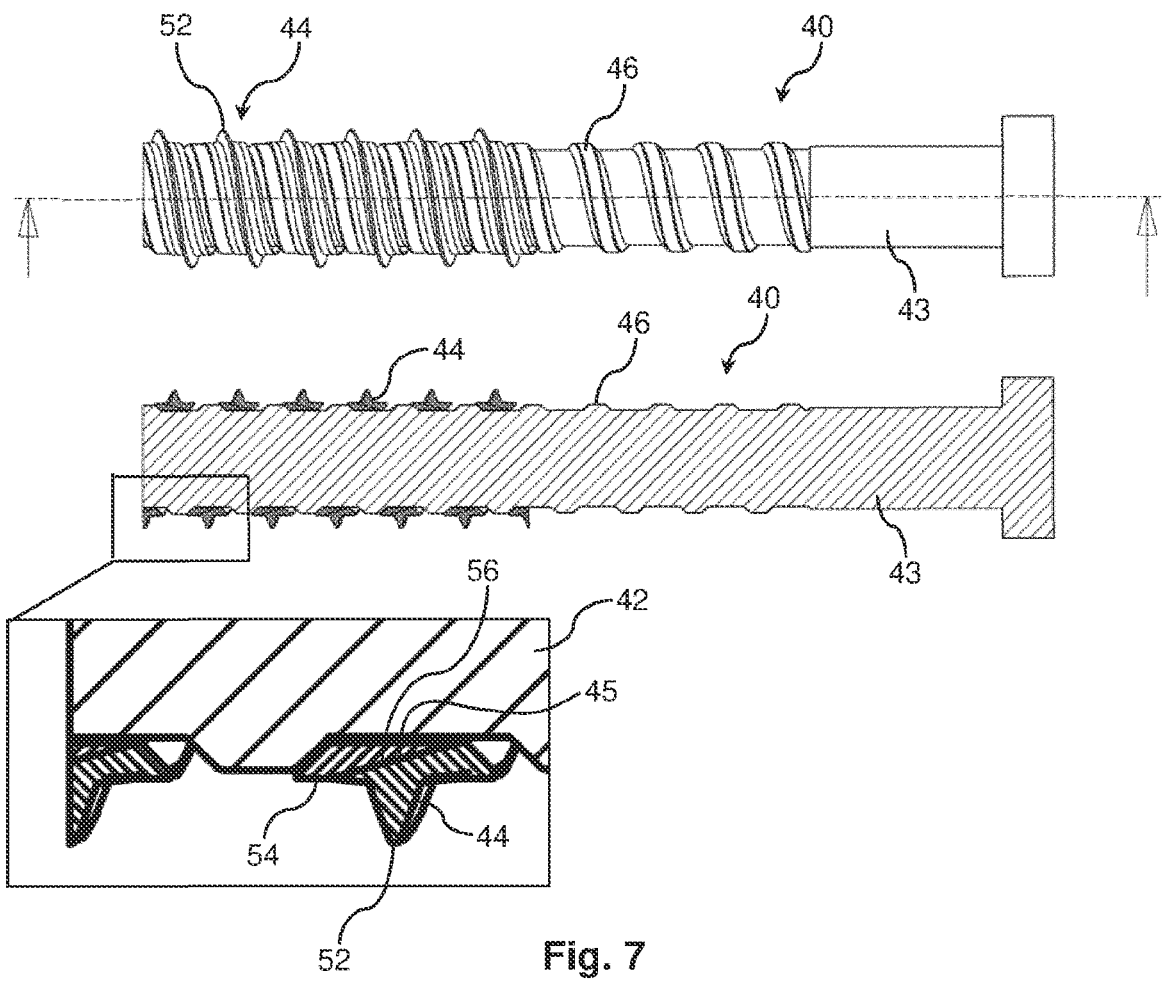
FIG. 7 shows a side view, a sectional view and an enlarged detail of the sectional view of a further two-part anchor which, in addition to a screw and a spiral coil, comprises an intermediate spiral coil having an inclined flank suitable for spreading the spiral coil under tensile load.

FIG. 7 shows a side view, a sectional view and an enlarged detail of the sectional view of a further two-part anchor which, in addition to a screw 43 and a spiral coil 44, comprises an intermediate spiral coil 54 having an inclined flank 56 suitable for spreading the spiral coil 44 under tensile load. It should be noted that in the present disclosure, a "two-part anchor" is always an anchor consisting of at least two parts, but can also contain further parts, such as the intermediate spiral coil 54 in the case shown. The function of the intermediate spiral coil 54 is to provide the inclined flank 56, so that the screw 43 or, alternatively, a threaded rod 42, in turn does not need to have such a strongly inclined flank 48. In this way, screws 43 or threaded rods 42 having standard threads can be used, such as the above-mentioned B15 thread. When the two-part anchor of FIG. 7 is subjected to tensile load, the bearing surface 45 of the spiral coil 44 is guided on the inclined surface or flank 56 of the intermediate spiral coil 54 in the direction of the leading end of the screw 43, whereby the spiral coil 44 is spread as a whole.

Figure 8:
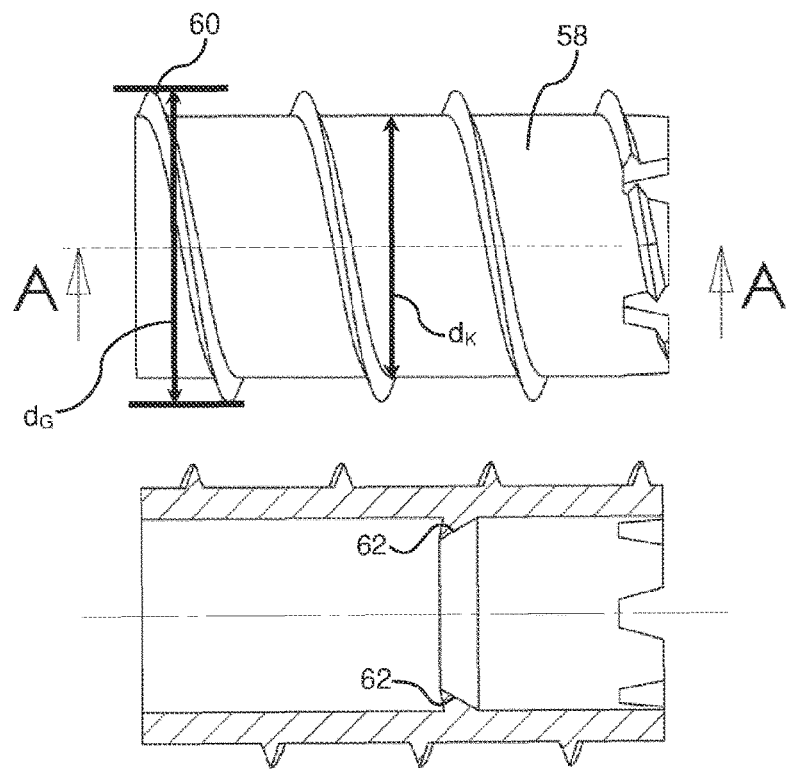
FIG. 8 shows a side view and a sectional view of a monolithic threaded sleeve having latching elements for forming a latching connection.
Figure 9:
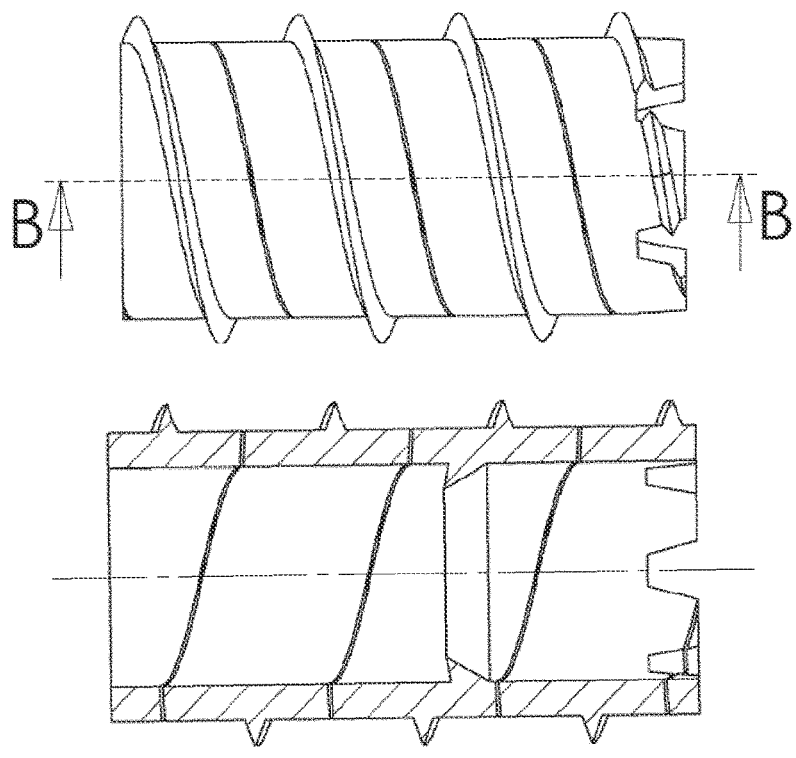
FIG. 9 shows a side view and a sectional view of a wound threaded sleeve having latching elements for forming a latching connection.
Figure 10:
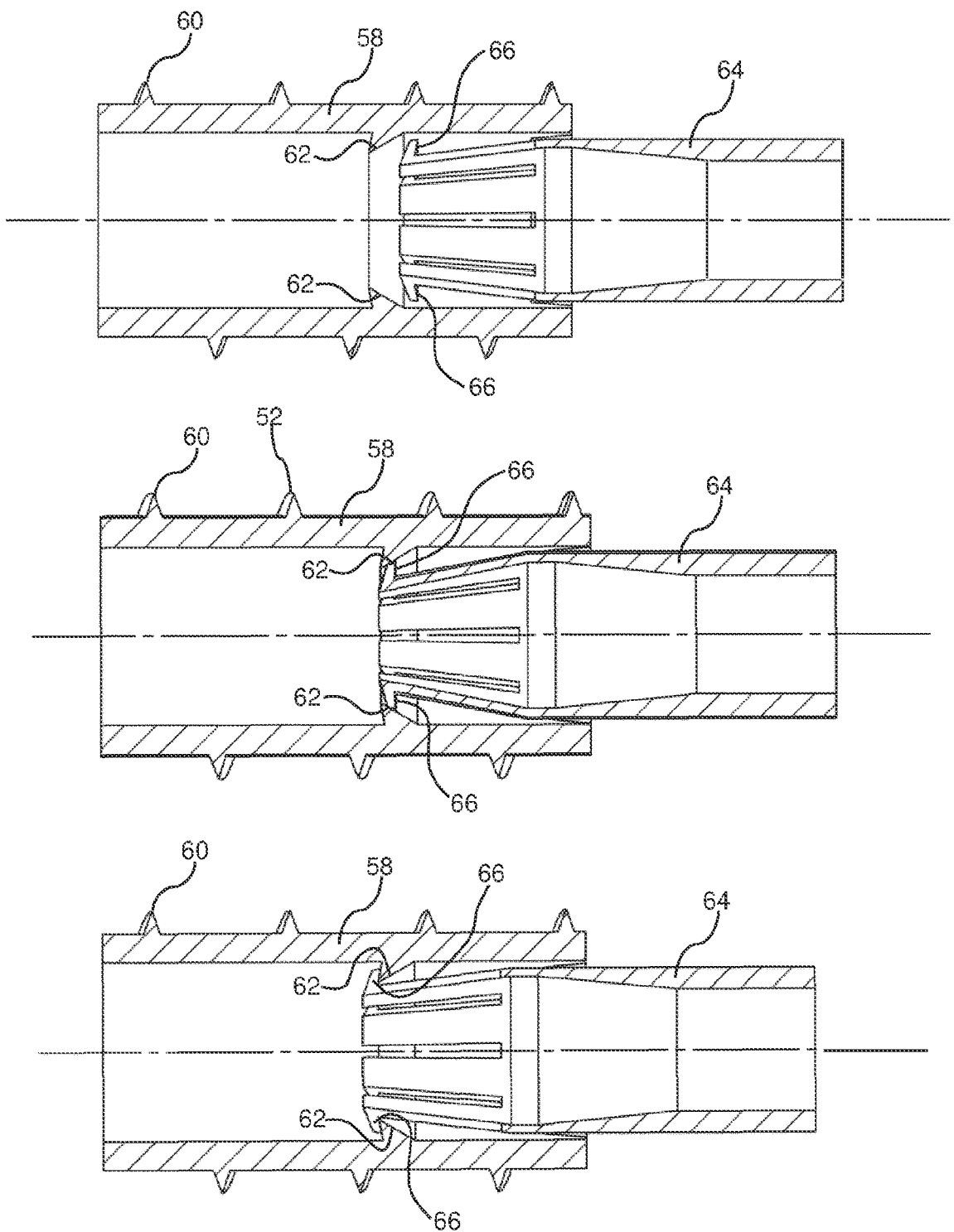
FIG. 10 shows a sequence of sectional views of the threaded sleeve of FIG. 8, into which a connection piece is latched.

FIG. 8 shows a side view and a sectional view of a monolithic threaded sleeve 58 on which an external thread 60 is formed. Such a threaded sleeve also forms an "anchor" within the meaning of the present disclosure, in which the "thread section" is formed by the external thread 60, which, as shown in FIG. 8, has an external diameter $d_G$. The region between two adjacent turns of the thread 60 forms a "core section" having a diameter $d_K$ (see FIG. 8) in the sense of the present disclosure. As can be seen in the sectional view, an annular latching element 62 is provided in the interior of the threaded sleeve 58 for forming a latching connection with a connection piece 64, which is shown in FIG. 10. FIG. 9 shows a similar embodiment of a threaded sleeve 58, which, however, is not formed monolithically, but is wound from a profile strip. Such a wound sleeve can be produced more cost-effectively than a monolithic one. Since, within the scope of preferred embodiments of the invention, the threaded sleeve is screwed into a pre-grooved internal thread in the borehole, that is, it is not itself used to groove the thread, the screwing torques required for screwing in the threaded sleeve 58 are limited. In this respect, the reduced torsional rigidity of a wound threaded sleeve 58 compared to a monolithic sleeve 58 is unproblematic in many applications. Instead of the annular latching element 62, an internal thread can also be provided in the interior of the threaded sleeve 58, into which internal thread, for example, a screw having a metric thread can be screwed.

FIG. 10 shows a sequence of sectional views of the threaded sleeve 58 of FIG. 8, into which a connection piece 64 is latched. For this purpose, the connection piece 64 comprises latching hooks 66 which are resiliently mounted and are suitable for latching onto the annular latching element 62. The annular latching element 62 and the latching hooks 64 form a type of snap connection by means of which the connecting piece 64 can easily be fastened in the threaded sleeve 58. The connection piece 64 can be formed from plastic, for example, and can be used, for example, to fasten insulating materials to a wall or ceiling. The threaded sleeve 58 could also be made of plastic for such applications. For fire protection reasons, however, both the threaded sleeve 58 and the connection piece 64 can consist of metal.

Figure 11:
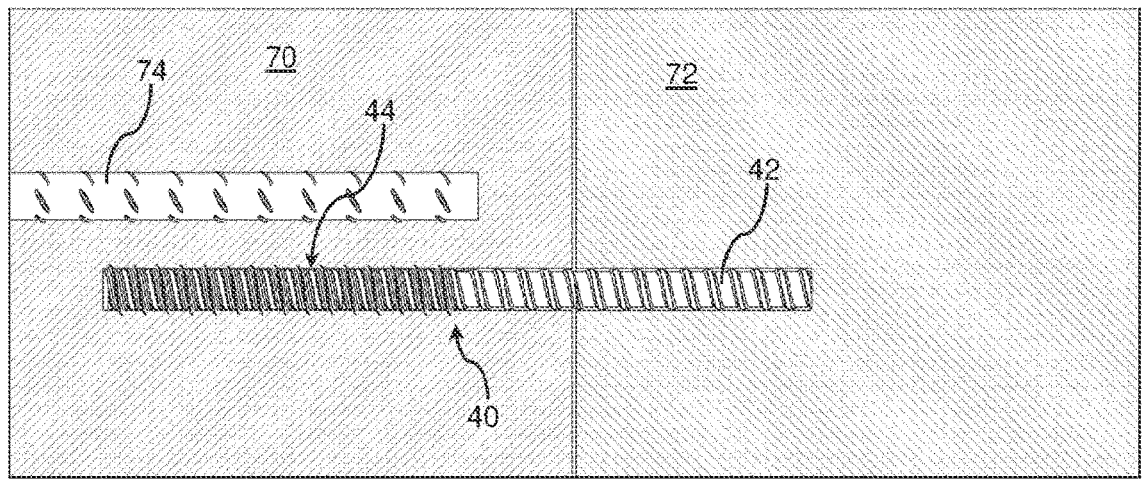
FIG. 11 shows a schematic sectional view of a connection reinforcement implemented with the aid of a two-part anchor.

FIG. 11 shows a sectional view of a so-called connection reinforcement. In concrete construction, connection reinforcement is a bridging or crossover reinforcement in the region of construction joints, in concrete casting stages or in precast concrete parts for later force-fitting connection with so-called in-situ concrete, that is, fresh concrete that is placed in components in their final position on the construction site and hardens there. Reference numeral 70 denotes an already existing concrete part reinforced with a conventional reinforcement rod 74 made of steel. It should be noted that in the present disclosure, as is customary in the technical field, the terms "reinforcement" and "reinforcement" are used synonymously. Reference numeral 72 denotes a concrete attachment past which was subsequently cast onto the existing concrete part 70 using in-situ concrete.

As explained above, the reinforcement rods for connection reinforcement in the prior art are introduced using a complex adhesive or bonding process, which includes laborious cleaning of the borehole with repeated flushing and blowing, metered filling with mortar or composite material, introduction of the reinforcement rod and hardening of the composite material for several hours. The subsequently introduced reinforcement rod forms an overlapping joint with the existing reinforcement rod 74, for which certain overlap lengths must be adhered to according to DIN EN 1992-1-1. In the connection reinforcement shown in FIG. 11, a two-part anchor 40 is used instead of another conventional reinforcement rod, as described in connection with FIGS. 3 to 5, and which is formed by a threaded rod 42 and a spiral coil 44. Said two-part anchor can be set much easier and faster than a conventional reinforcement rod according to the conventional adhesive or bonded method. After the two-part anchor 40 has been placed in the overlapping joint, the attachment part 72 can be produced with in-situ concrete.

Figure 12:
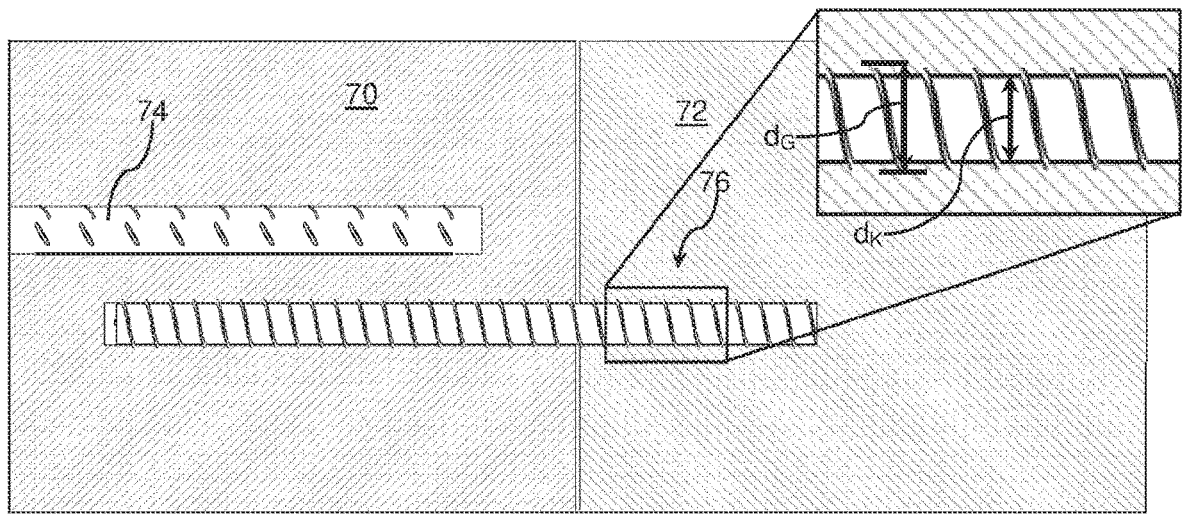
FIG. 12 shows a schematic sectional view of a connection reinforcement, which is implemented with the aid of a threaded rod having a concrete screw thread.

FIG. 12 shows a connection reinforcement similar to FIG. 11, with the only difference that, instead of the two-part anchor 40, a threaded rod 76 having a concrete screw thread is used. In the present disclosure, a "concrete screw thread" is understood to mean a thread designed to be screwed directly, that is, without the use of dowels or the like, into a concrete substrate. The person skilled in the art can readily distinguish a concrete screw thread from a thread for other purposes, in particular from a wood screw thread or a thread for interaction with a nut (for example, a metric thread) and the like. In the present disclosure, "concrete screw thread" is understood to mean in particular a thread which, apart from its length, is similar in its geometry to a thread used in a concrete screw having a technical approval in Europe or the USA on the priority date of the present application. In the present disclosure, a "concrete screw thread" is further understood to be a thread having a geometry which, if used in a screw having a permissible length, would receive a European technical assessment/approval (ETA) according to the regulations applicable on the priority date of the present application. An enlarged view of part of the threaded rod 76 is shown in FIG. 12, in which the outer diameter of the thread section $d_G$ and the core diameter $d_K$ of the core section are drawn.

Instead of the threaded rod 76, a concrete screw having a head at its trailing end, that is, the right end in the illustration of FIG. 12, could also be used. It should be noted that sufficiently long screws or threaded rods having concrete screw thread with which a connection reinforcement, as shown schematically in FIG. 12, could be produced, to the knowledge of the inventors are not known in the prior art, because they have not previously been considered for the purposes described herein, and such lengths are not considered for conventional applications in concrete. On the contrary, according to EAD 330232-00-0601, the effective anchoring depth for screw anchors in concrete must not exceed eight times the nominal diameter $d_b$ of the borehole, so that known screw anchors for use in concrete usually have threads having a length which does not exceed eight times the nominal diameter $d_b$ of the borehole or at most only slightly exceeds it. The length of the threaded rod 76 shown schematically in FIG. 12, however, in the applications provided here, can exceed the nominal diameter $d_b$ by more than ten times, preferably more than twelve times, particularly preferably more than fifteen times and in particular more than thirty times. Since the concrete screw thread is formed over the entire length of the threaded rod 76, the "length of the thread section" mentioned at the beginning is identical to the length of the threaded rod 76. Despite the relatively large anchoring depth in the concrete part 70, the threaded rod 76 having a concrete screw thread can be screwed in with comparatively low insertion torques because the internal thread can be previously grooved in the borehole using a grooving tool 10 according to one of the embodiments described here.

In preferred embodiments, the threaded rod 76 is produced with a manufacturing tolerance of less than $0.2 \cdot (d_b)^{0.3}$ mm in relation to the core diameter $d_K$, the grooving tool 10 is manufactured with a manufacturing tolerance of less than $0.1 \cdot (d_b)^{0.3}$ mm in relation to the diameter $d_o$ of the imaginary cylinder on which the cutting edges 26 lie, and the following applies: $0.0 \text{ mm} \leq d_o - d_K \leq 0.7$ mm, preferably $0.1 \text{ mm} \leq d_o - d_K \leq 0.5$ mm. As explained at the beginning, the nominal diameter $d_b$ of the borehole corresponds to the size specification of a drill to which the anchor is adapted, in millimeters, but is itself dimensionless. The manufacturing tolerances are scaled to the power of 0.3 of the nominal diameter $d_b$. This dimensioning results in a very small volume between the core of the threaded rod 76 and the borehole wall. Nevertheless, excessive screwing-in torques can be avoided if the borehole wall is machined using the above-described grooving tool 10, so that the friction between the core section and the borehole wall can be kept comparatively low. High load capacities result in practice for the reasons explained above.

In preferred embodiments, the threaded rod 76 is produced with a manufacturing tolerance of less than $0.2 \cdot (d_b)^{0.3}$ mm in relation to the outer diameter $d_G$ of its thread, the grooving tool (10) is also produced with a manufacturing tolerance of less than $0.2 \cdot (d_b)^{0.3}$ mm in relation to the maximum outer diameter $d_F$ its grooving thread 18, and the following applies:

$$0.0 \leq (d_F - d_G)/d_K \leq 0.15, \text{ preferably } 0.025 \leq (d_F - d_G)/d_K \leq 0.10$$

Herein, the reference to the "maximum outer diameter $d_F$ of the grooving thread 18" takes into account, as mentioned at the beginning, the fact that the grooving thread 18 of the grooving tools 10 shown in FIGS. 1 and 2 has a variable outer diameter in order to form the start of the groove. However, only the maximum external diameter $d_F$ (see FIG. 2a) is decisive for the depth of the ultimately grooved internal thread. The same applies to the concrete screw thread of the threaded rod 76, which can also have an increasing thread diameter at its leading end (not shown in FIG. 12), but the outer diameter of the thread is constant over the major part of the length of the threaded rod 76, and said constant diameter is denoted by $d_G$. In other words, the outer diameter $d_G$ corresponds to the diameter of the smallest imaginary cylinder into which the thread of the threaded rod 76 can be inscribed as a whole.

In contrast to the prior art cited at the beginning, this embodiment expressly does not provide for the outer diameter $d_G$ of the thread of the anchor to be selected to be greater than the maximum outer diameter $d_F$ of the grooving thread. While in the prior art, an undersize of the pre-cut internal thread compared to the external thread of the anchor is as being advantageous in order to artificially remove substrate particles and to increase the insertion torque for the purpose of a "solid setting feeling", in preferred embodiments, the borehole is machined with the aid of the grooving tool 10, so that it lies as close as possible to the core section of the respective anchor everywhere. A limiting factor for the anchor diameter remains the friction of the core or core section on the borehole wall and an associated increase in the insertion torque, despite the machining of the borehole to approximate an ideal cylindrical shape. Preferred embodiments of the invention therefore avoid the additional screw-in resistance, as it is deliberately created in the prior art discussed at the beginning by deformation work at the tip of the anchor thread, in favor of the possibility of choosing the larger core diameter of the anchor in order to thereby increase the load-bearing capacity for the reasons explained above.

Figure 2D:
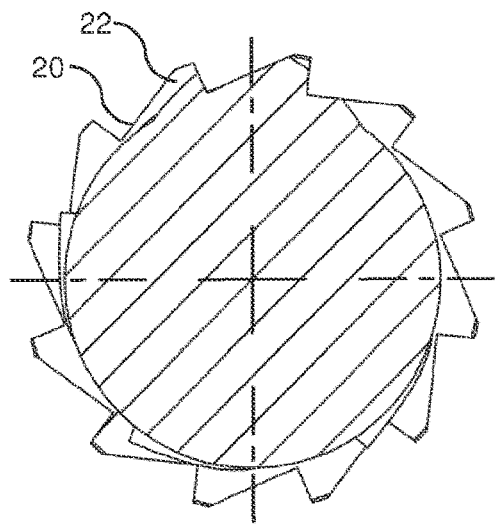

In order to be able to set the threaded rod 76 with a concrete screw thread or a correspondingly long concrete screw even more easily, it was proposed in connection with the grooving tool 10 of FIGS. 1 to 2d to provide a drive element 34 at the leading end 12a of the base body 12, which drive element 34 is intended to interact with a force application device of an associated anchor for this purpose. For the threaded rod 76, the force application device could, for example, be a hexagonal recess, while the drive element 34 could be formed by a hexagonal drive. In this case, immediately after the grooving of the thread in the borehole, the threaded rod 76 can be screwed into the existing component 70 using the same machine that was used for the grooving, without having to change the tool. Note that at the point in time at which the threaded rod 76 is screwed into the mounting base 70, the attachment part 72 is not yet present, and both the trailing end of the threaded rod 76 with power drive (that is, the right end in FIG. 12) and the grooving tool 10 used for screwing in (not shown in FIG. 12) always remains outside the mounting base 70.

In some applications, however, it may be necessary or desirable to completely countersink the anchor, or in the case of a two-part or multi-part anchor, a part of the same in the existing component 70. This applies, for example, to the spiral coil 44 of the two-part anchor 40 shown in FIG. 11, which is screwed completely into the existing component 70. A simple hexagonal drive element at the leading end of the grooving tool 10 is not suitable for these purposes. In order to completely countersink the anchor or anchor part in the mounting base 70, the grooving tool 10 must again be at least partially screwed into the borehole, so that it would typically have to groove a further thread. Furthermore, the hexagonal drive element of the grooving tool cannot easily be separated from the force application device after the desired insertion depth in the fastening base has been reached when the grooving tool itself is in the borehole. In order to be able to carry out a countersunk screwing in without a tool change, a further grooving tool 10 having a drive element 34 suitable for this purpose is described in connection with FIGS. 13 to 16.

Figure 13:
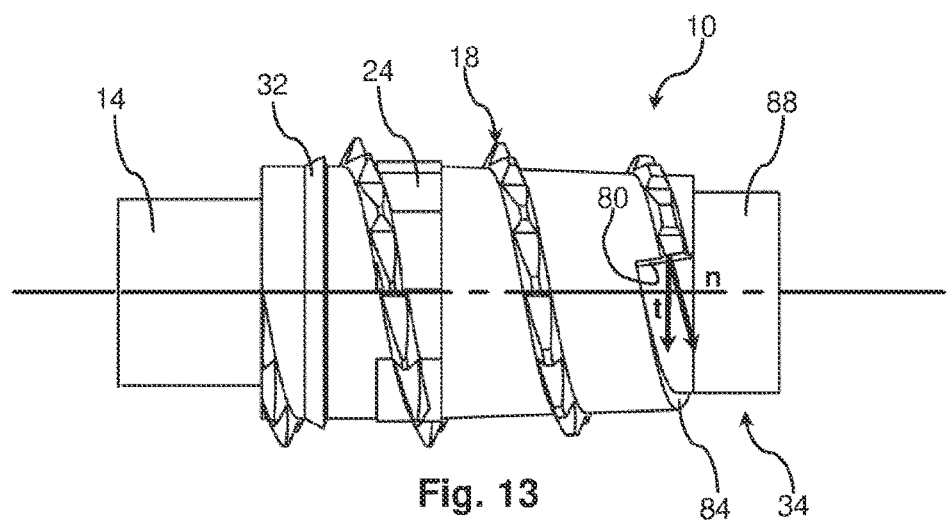
FIG. 13 shows a side view of a grooving tool having a drive element allowing an anchor or part of an anchor to be completely sunk into the mounting base.
Figure 14:
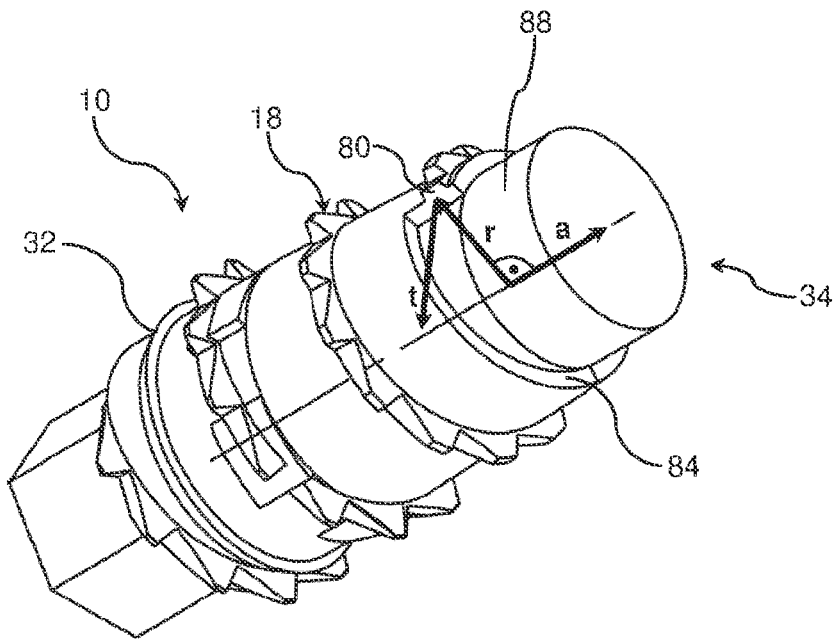
FIG. 14 shows a perspective view of the grooving tool of FIG. 13.

FIGS. 13 and 14 respectively show a side view and a perspective view of a grooving tool 10, at the leading end of which a drive element 34 is formed, which drive element 34 comprises a first stop surface 80, a second stop surface 84 and an axial projection 88. Said drive element 34 is intended to interact with a "force application device" of a spiral coil 44, which also has a first stop surface 82, a second stop surface 86 (which in the embodiment shown in FIGS. 15 and 16 are simply formed by the edges at the trailing end of the spiral coil 44) and a receptacle for receiving the axial projection 88, which in the present case is formed by the cylindrical interior 90 of the spiral coil 44.

Figure 15:
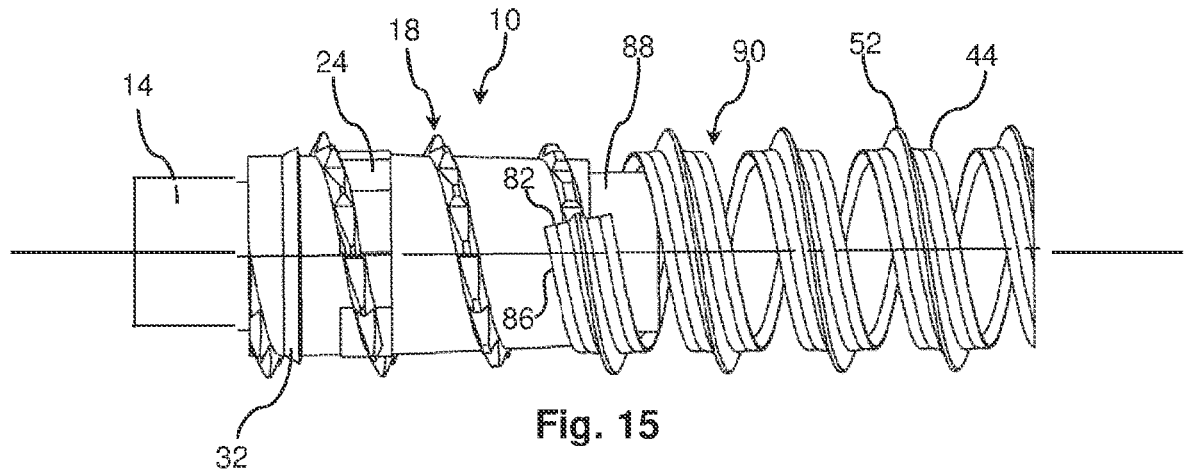
FIG. 15 shows a side view of the grooving tool of FIGS. 13 and 14, which is in an engagement position with a spiral coil of a two-part anchor.
Figure 16:
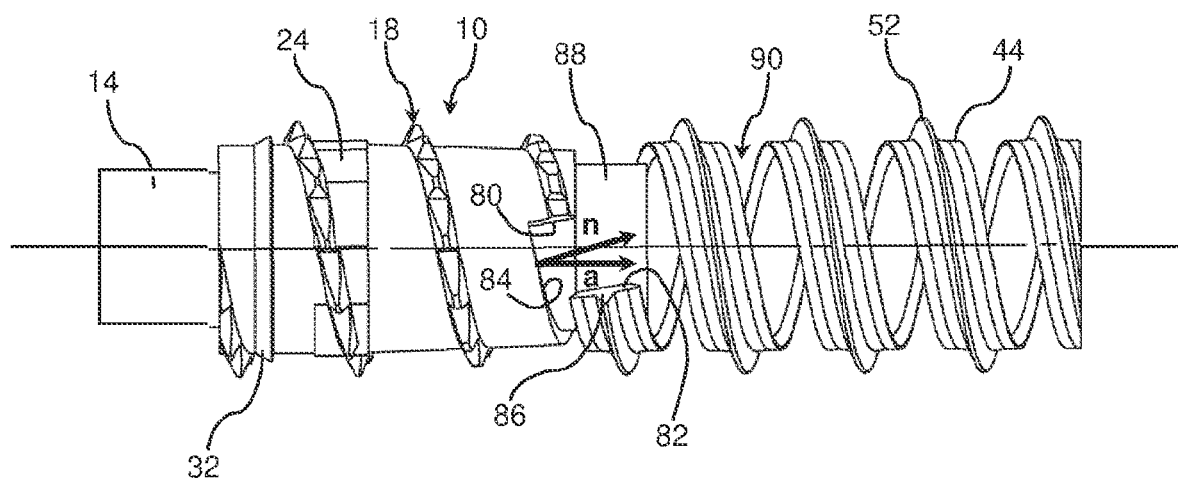
FIG. 16 shows a side view similar to FIG. 15, but in a situation in which the grooving tool has left the engagement position.

The drive element 34 of the grooving tool 10 and the force application device of the spiral coil 44 can assume an engagement position, which is shown in FIG. 15, and in which the first surfaces 80, 82 and the second surfaces 84, 86 of the drive element 34 and the force application device abut one another, and in which the axial projection 88 of the drive element 34 is received in the receptacle, that is, in the axial interior 90 of the spiral coil 44. It can be seen that the drive element 34 of the grooving tool 10 and the force application device of the spiral coil 44 are adapted to one another such that in this engagement position the relative alignment of the grooving tool 10 and the spiral coil 44 is set such that the grooving thread 18 lies on an imaginary continuation of the thread 52 of the spiral coil 44, when the grooving tool 10 is rotated in the screwing-in direction, a torque can be transmitted from its drive element 34 to the "force application device" of the spiral coil 44, which in the present example is simply formed by the trailing end of the same, and when the grooving tool 10 is rotated counter to the screwing-in direction, no torque can be transmitted from its drive element 34 to the force application device of the spiral coil 44.

Since the grooving tool 10 and the spiral coil 44 are aligned in relation to one another in the engagement position shown in FIG. 15, the thread 18 lying on the imaginary continuation of the thread 52 of the spiral coil 44, the grooving tool 10 can be screwed into the borehole again (not shown in FIGS. 15 and 16) when the spiral coil 44 is screwed in, without grooving a further thread, because the grooving thread 18 is automatically guided into the already existing grooved thread in the borehole due to the synchronization described above with the thread 52 of the spiral coil 44. As long as the grooving tool 10 is rotated in the screwing-in direction, it further transmits a torque from its drive element 34 to the force application device of the spiral coil 44, so that said spiral coil 44 is screwed into the thread grooved in the borehole. When the spiral coil 44 has reached the desired insertion depth, as shown for example, in FIG. 1i, the direction of rotation of the grooving tool 10 is reversed so that it is screwed out of the borehole. No torque is exerted on the force application device of the spiral coil 44 in this reverse direction of rotation, so that the spiral coil 44 remains in the countersunk position in the fastening base 70.

Depending on the type of anchor/anchor part to be screwed in, various drive elements and associated force application devices can be provided, which offer the functionality described here, that is, the synchronization of grooving thread 18 and anchor thread 52, torque transmission in the screwing-in direction and no torque transmission counter to the screwing-in direction. It is emphasized that this aspect of the invention is not limited to a specific configuration of drive element 34 and force application device. However, drive elements 34 have proven to be particularly suitable which have a first stop surface, the surface normal n of which at least approximately corresponds to a tangential vector t, which at all times indicates the direction in which the first stop surface 80 moves due to the rotation (but not the axial advance) of the grooving tool 10 in the screwing-in direction in order to be able to effectively transmit a torque to an associated first stop surface 82 of the force application device. The vectors n and t are shown in FIG. 13. Specifically, the surface normal of the first stop surface 80 should form an angle of at most 45°, preferably at most 30° and particularly preferably at most 15° with the tangential vector t. This can be seen, for example, in FIG. 13, in which it can be seen that the angle between the vectors n and t is comparatively small and, in the present case, corresponds to the pitch angle of the threads 18, 52. For pure torque transmission, it would be preferable if the surface normal n exactly matches the tangential vector t, but the geometry shown has the advantage that the manufacture of the "force application device" is simplified for the spiral coil 44, which here is simply formed by the edges 82, 86 at the trailing end of the wound profile strip of which the spiral coil 44 is made.

The tangential vector t can be mathematically expressed as a vector product of an axial vector a, which is directed in the direction of the leading end of the grooving tool, and defining a radial vector r, the tip of which lies on the first stop surface, so that: t=a×r, see in particular FIG. 14.

The first stop surfaces 80 and 82, which are aligned as described, generally allow a torque to be effectively transmitted to the force application device of the anchor/anchor part when the grooving tool 10 is being screwed in. Furthermore, the first stop surfaces 80, 82 help to define the relative alignment of the grooving tool 10 and the anchor/anchor part in relation to their rotational position when the first stop surfaces 80, 82 rest against one another in said engagement position, in order to thereby ensure the synchronization of the anchor thread 52 and the grooving thread 18 in relation to their rotational position. When unscrewing the grooving tool 10, on the other hand, the first stop surfaces 80, 82 simply lift off from one another, so that no torque is transmitted from the grooving tool 10 to the force application device of the anchor/anchor part, and the anchor/anchor part can remain in the substrate while the grooving tool 10 is unscrewed.

Furthermore, it has generally proven to be advantageous if the drive element 34 of the grooving tool 10, regardless of its specific design, has a second stop surface 84, the surface normal n of which has a component in the direction of the axial vector a, and the force application device of the anchor/anchor part has a second stop surface 86 which rests on the second stop surface 84 of the drive element 34 when the drive element 34 and the force application device assume the engagement position. This criterion is obviously met with regard to the second stop surfaces 84, 86 in the embodiment shown in FIGS. 13 to 16. The surface normal n of the second stop surface 84 of the drive element 34 is shown in FIG. 16, and it can in turn be seen that the surface normal n only forms a small angle with the axial vector a, which in turn corresponds to the pitch angle of the threads 18, 52. In any case, however, the surface normal n has a (positive) component in the direction of said axial vector a. In preferred embodiments, the angle between the surface normal n of the second stop surface 84 and the axial vector a is less than 45°, preferably less than 30°. The second stop surfaces 84, 86 help to define the relative alignment of the grooving tool 10 and the anchor/anchor part in relation to their axial position when the second stop surfaces 84, 86 rest against one another in said engagement position, in order to thereby ensure the synchronization of the anchor thread 52 and the grooving thread 18 with respect to their axial position.

Finally, it has generally proven to be advantageous if the drive element 34 has an axial projection and the force application device of the anchor has a receptacle for receiving the axial projection when the drive element and the power drive assume the engagement position, as is shown in the specific exemplary embodiment through the axial projection 88 and the interior 90 of the spiral coil 44 serving as a "receptacle". The combination of an axial projection with a receptacle generally enables a secure engagement between the drive element 34 of the grooving tool 10 and the force application device of the anchor/anchor part to be produced.

Although the invention has been described on the basis of specific embodiments, it goes without saying that the embodiments shown serve only to illustrate the invention, but do not restrict it. Instead, the invention is only limited by the features indicated in the appended claims.

What is claimed is:

1. A system for fastening an anchor in a borehole in a mineral substrate, in particular concrete, mortar or masonry, comprising
    an anchor having a core section and a thread section, the core section having a core diameter $d_K$ and the thread section having an outer diameter $d_G$, and
    a grooving tool, different from said anchor, for grooving an internal thread in the borehole, the grooving tool comprising the following:
    a base body having a leading and a trailing end, a force application device being provided, via which a torque for screwing the grooving tool into the borehole and for grooving the thread is transmitted to the base body, the base body having an outer surface on which a grooving thread is formed, which is suitable for grooving the internal thread into the wall of the borehole, characterized in that a plurality of elevations are formed on the outer surface of the base body, each having a cutting edge, wherein at least a section of all cutting edges lie on an imaginary cylinder having a diameter do, and wherein the cutting edges are suitable to at least partially remove the inner wall of the borehole when screwing the grooving tool into the borehole in order to adapt the inner wall of the borehole to the imaginary cylinder.

2. The system according to claim 1, wherein the cutting edge is formed by an edge on which a substantially radial surface inclined by less than 30° with respect to the radial direction, and a substantially tangential surface inclined by at least 45° with respect to the radial direction, meet one another, wherein the surface normal of the substantially radial surface points in the screwing-in direction.

3. The system according to claim 1, wherein the grooving tool has at least four of said elevations with associated cutting edge.

4. The system according to claim 1, wherein the anchor is produced with a manufacturing tolerance of less than $0.2 \cdot (d_b)^{0.3}$ mm with respect to the core diameter $d_K$, the grooving tool is produced with a manufacturing tolerance of less than $0.1 \cdot (d_b)^{0.3}$ mm with respect to the diameter $d_0$, wherein $d_b$ is the numerical value of the nominal diameter of the borehole in millimeters, and wherein the following applies:

$$0.0 \text{ mm} \leq (d_F - d_G)/d_K \leq 0.15.$$

5. The system according to claim 1, wherein the anchor is produced with a manufacturing tolerance of less than $0.2 \cdot (d_b)^{0.3}$ mm in relation to the outer diameter $d_G$ of its thread, the grooving tool is produced with a manufacturing tolerance of less than $0.2 \cdot (d_b)^{0.3}$ mm in relation to the maximum outer diameter $d_F$ of its grooving thread, wherein $d_b$ is the numerical value of the nominal diameter of the borehole in millimeters, and wherein the following applies:

$$0.0 \leq (d_F - d_G)/d_K \leq 0.15.$$

6. The system according to claim 1, wherein the grooving thread has a plurality of turns, and the plurality of elevations are arranged between turns of the grooving thread.

7. The system according to claim 1, wherein the grooving thread has fewer than four turns.

8. The system according to claim 1, wherein the grooving tool has an annular wiping element suitable for wiping drill dust from the borehole wall.

9. The system according to claim 1, wherein the outer diameter of the grooving thread decreases in the direction of the leading end, and
    wherein recesses are formed in the grooving thread and incisors are formed between adjacent recesses.

10. The system according to claim 1, wherein the grooving tool, at least, however, its grooving thread and the elevations, have a Rockwell hardness of at least 55 HRC.

11. The system according to claim 1, wherein the grooving tool, at least, however, the grooving thread and the elevations, consist of an alloyed steel, tool steel, stellite, a ceramic material or a hard metal.

12. The system according to claim 1, wherein the grooving tool has a drive element at its leading end, which is suitable to interact with a force application device of the anchor or a part of the same, which is to be screwed into the borehole treated with the grooving tool.

13. The system according to claim 12, in which the drive element is a polygonal drive or a hexalobal drive.

14. The system according to claim 12, in which the drive element of the grooving tool and the force application device of the anchor are adapted to one another such that they can assume an engagement position, and in this engagement position
    the relative orientation of the grooving tool and the anchor or said part of the same is predetermined such that the grooving thread lies on an imaginary continuation of the thread of the anchor,
    when the grooving tool is rotated in the screwing-in direction, a torque can be transmitted from its drive element to the force application device of the anchor or part of the same, and when the grooving tool is rotated counter to the screwing-in direction, no torque can be transmitted from its drive element to the force application device of the anchor or the part of the same.

15. The system according to claim 1, in which the anchor is formed by a threaded sleeve having an external thread forming said thread section,
   wherein the threaded sleeve has an internal thread, in particular a metric internal thread, or
   wherein the threaded sleeve is wound from a profile strip having a radially inner and a radially outer side, wherein a thread ridge is formed on the radially outer side, which thread ridge is suitable to be screwed into the internal thread in the borehole grooved with the aid of the grooving tool.

16. The system according to claim 1, in which the anchor is formed in at least two parts and comprises the following:
   a spiral coil which can be screwed into the internal thread in the borehole grooved with the aid of the grooving tool, wherein the spiral coil is formed by a wound profile strip having a radially inner and a radially outer side, wherein a thread ridge is formed on the radially outer side, which thread ridge is suitable for being screwed into the internal thread in the borehole grooved with the aid of the grooving tool, and
   a screw or threaded rod having an external thread suitable to be screwed into the spiral coil.

17. The system according to claim 1, the following applying to the ratio of the length $h_{\textit{eff}}$ of the thread section of the anchor and the nominal diameter $d_b$ of the borehole:

$$h_{\textit{eff}}/d_b \geq 15.0.$$

18. A method for fastening an anchor having a core section and a thread section in a borehole in a mineral substrate, comprising the following steps:
   drilling a borehole,
   grooving an internal thread in the borehole by screwing a grooving tool into the borehole, and
   inserting the anchor into the borehole,
   the grooving tool comprising the following:
   a base body having a leading and a trailing end, a force application device being provided via which a torque for screwing the grooving tool into the borehole and for grooving the thread is transferred to the base body, the base body having an outer surface on which a grooving thread is formed, which is suitable for grooving the inner thread into the wall of the borehole, characterized in that a plurality of elevations are formed on the outer surface of the base body of the grooving tool, each having a cutting edge, wherein all cutting edges lie on an imaginary cylinder having a diameter $d_0$,
   wherein the inner wall of the borehole is at least partially removed with the aid of the cutting edges when the grooving tool is screwed into the borehole, in order to adapt the inner wall of the borehole to the imaginary cylinder.

19. The method according to claim 18, wherein the anchor has a core diameter $d_K$, and wherein the following applies:

$$0.0 \text{ mm} \leq d_0 - d_K \leq 0.7 \text{ mm}.$$

20. The method according to claim 18, wherein the anchor has a core diameter $d_K$, the thread of the anchor has an outer diameter $d_G$, and the grooving thread of the grooving tool has a maximum diameter $d_F$, and wherein the following applies:

$$0.0 \leq (d_F - d_G)/d_K \leq 0.15.$$

21. The method according to claim 18, wherein the grooving tool has an annular wiping element, wherein drill dust is wiped from the borehole wall with the aid of the annular wiping element when the grooving tool is screwed in and/or unscrewed.

22. The method according to claim 18, wherein the grooving tool at its leading end has a drive element suitable for interacting with a force application device of the anchor or of a part of the same, and with the aid of which the anchor or the part of the same is screwed into the borehole treated with the grooving tool.

23. The method according to claim 22, wherein the drive element is a polygon or a hexalobe drive.

24. The method according to claim 22, wherein inserting the anchor into the borehole comprises the following steps:
   bringing the drive element of the grooving tool and the force application device of the anchor or the part of the same into an engagement position in which the relative orientation of the grooving tool and the anchor or said part of the same is predetermined such that the grooving thread lies on an imaginary continuation of the thread of the anchor,
   rotating the grooving tool in the screwing-in direction, wherein a torque is transmitted from its drive element to the force application device of the anchor or the part of the same in order to screw the anchor or the part of the same into the borehole until the anchor or part of the anchor is located completely and the grooving tool is at least partially located in the borehole,
   rotating the grooving tool counter to the screwing-in direction in order to screw it out of the borehole, wherein it does not transmit any torque from its drive element to the force application device of the anchor or of the part thereof.

25. The method according to claim 18, in which the anchor is formed in at least two parts and comprises the following:
   a spiral coil which can be screwed into the internal thread in the borehole grooved with the aid of the grooving tool, wherein the spiral coil is formed by a wound profile strip having a radially inner and a radially outer side, wherein a thread ridge is formed on the radially outer side, which thread ridge is suitable for being screwed into the internal thread in the borehole grooved with the aid of the grooving tool, and
   a screw or threaded rod having an external thread which can be screwed into the spiral coil, and wherein said insertion of the anchor into the borehole comprises the following:
   screwing the spiral coil into the internal thread in the borehole that has been grooved with the aid of the grooving tool, and
   screwing the screw or threaded rod into the spiral coil.

26. The method according to claim 18, wherein the anchor is inserted into the borehole with an effective anchoring depth $h_{\textit{eff}}$, wherein the following applies to the ratio of the effective anchoring depth $h_{\textit{eff}}$ and the nominal diameter $d_b$ of the borehole:

$$h_{\textit{eff}}/d_b \geq 15.0.$$

27. The method of claim 18, wherein said anchor is fastened in said borehole for reinforcing said mineral substrate, or for forming an overlap jointin said mineral substrate.

28. A grooving tool for grooving an internal thread in a borehole formed in a mineral substrate, the grooving tool comprising the following:

a base body having a leading and a trailing end, a force application device being provided, via which a torque for screwing the grooving tool into the borehole and for grooving the thread is transmitted to the base body, the base body having an outer surface on which a grooving thread is formed, which is suitable for grooving the internal thread into the wall of the borehole, characterized in that a plurality of elevations are formed on the outer surface of the base body, each having a cutting edge, wherein at least a section of all cutting edges lie on an imaginary cylinder, and wherein the cutting edges are suitable to at least partially remove the inner wall of the borehole when screwing the grooving tool into the borehole in order to adapt the inner wall of the borehole to the imaginary cylinder, wherein the force application device has a diameter larger than the diameter of the imaginary cylinder.

29. The grooving tool according to claim 28, wherein the grooving tool has a drive element at its leading end, which is suitable to interact with a force application device of an anchor or a part of the same, which is to be screwed into the borehole treated with the grooving tool, wherein the drive element is preferably a polygonal drive or a hexalobal drive.

* * * * *

UNITED STATES PATENT AND TRADEMARK OFFICE
CERTIFICATE OF CORRECTION

PATENT NO. : 12,025,167 B2
APPLICATION NO. : 17/632010
DATED : July 2, 2024
INVENTOR(S) : Andreas Heck and Ulrich Hettich It is certified that error appears in the above-identified patent and that said Letters Patent is hereby corrected as shown below:

In the Claims

In Column 25, Claim 1, Line 59, delete "do" and insert --$d_0$--.

In Column 26, Claim 4, Line 16, delete "0.0 mm≤($d_F$-$d_G$)/$d_K$≤0.15.." and insert --0.0 mm≤ $d_0$-$d_K$≤0.7 mm--.

Signed and Sealed this
First Day of April, 2025

Coke Morgan Stewart
*Acting Director of the United States Patent and Trademark Office*